US008822914B2

(12) United States Patent
Goshawk et al.

(10) Patent No.: US 8,822,914 B2
(45) Date of Patent: Sep. 2, 2014

(54) METHOD OF SCREENING A SAMPLE FOR THE PRESENCE OF ONE OR MORE KNOWN COMPOUNDS OF INTEREST AND A MASS SPECTROMETER PERFORMING THIS METHOD

(75) Inventors: Jeffrey Alan Goshawk, Blackburn (GB); Steven Derek Pringle, Darwen (GB); Steve Smith, Stockport (GB)

(73) Assignee: Micromass UK Limited, Wilmslow (GB)

( * ) Notice: Subject to any disclaimer, the term of this patent is extended or adjusted under 35 U.S.C. 154(b) by 247 days.

(21) Appl. No.: 13/394,089

(22) PCT Filed: Sep. 6, 2010

(86) PCT No.: PCT/GB2010/001688
§ 371 (c)(1), (2), (4) Date: Jun. 12, 2012

(87) PCT Pub. No.: WO2011/027131
PCT Pub. Date: Mar. 10, 2011

(65) Prior Publication Data

US 2012/0241602 A1 Sep. 27, 2012

Related U.S. Application Data

(60) Provisional application No. 61/245,401, filed on Sep. 24, 2009.

(30) Foreign Application Priority Data

Sep. 4, 2009 (GB) .................................. 0915474.1

(51) Int. Cl.
*B01D 59/44* (2006.01)

(52) U.S. Cl.
USPC .......................................... 250/281; 250/282

(58) Field of Classification Search
CPC .......................... H01J 49/0045; H01J 49/0081
USPC .......................... 250/282, 283, 281, 286, 288
See application file for complete search history.

(56) References Cited

U.S. PATENT DOCUMENTS 6,982,414 B2 * 1/2006 Bateman et al. .............. 250/282
7,928,363 B2 * 4/2011 Bateman ....................... 250/283
2001/0052569 A1 * 12/2001 Bateman et al. .............. 250/288

(Continued)

FOREIGN PATENT DOCUMENTS

GB 2363249 12/2001
GB 2391699 11/2004

(Continued)

*Primary Examiner* — Nikita Wells
*Assistant Examiner* — Johnnie L Smith
(74) *Attorney, Agent, or Firm* — Diederiks & Whitelaw, PLC

(57) ABSTRACT

A method of screening a sample for the presence of one or more known compounds of interest is disclosed. A fragmentation device is repeatedly switched between a fragmentation mode of operation and a non-fragmentation mode of operation. A determination is made whether a candidate parent ion of interest is present in a non-fragmentation data set and whether one or more corresponding fragment ions of interest are present in a fragmentation data set. A further determination is made to check if the candidate parent ion of interest and the one or more corresponding fragment ions of interest have substantially similar elution or retention times and/or ion mobility drift times.

23 Claims, 19 Drawing Sheets

(56) References Cited

U.S. PATENT DOCUMENTS

| | | | | |
|---|---|---|---|---|
| 2004/0041091 A1* | 3/2004 | Bateman et al. | .............. | 250/282 |
| 2009/0014639 A1* | 1/2009 | Bateman | ....................... | 250/281 |
| 2010/0108878 A1* | 5/2010 | Bateman et al. | .............. | 250/283 |

FOREIGN PATENT DOCUMENTS

| | | |
|---|---|---|
| GB | 2432712 | 5/2007 |
| GB | 2438488 | 11/2007 |
| WO | WO 2006/133191 | 10/2006 |

* cited by examiner

Target Compounds: 4277_019

35 Positive; 4 Tentative; 2 Negative

√e Aldicarb (C5H9NS, m/z 116.0534, Transition m/z 116.0534, 3.57 min)
√e Azoxystrobin (C22H17N305, m/z 404.1246, Transition m/z 329.0804, 6.34 min)
?e Azinphos-methyl (C8H5NO, m/z 132.0449, Transition m/z 160.0511, 5.96 min)
√ Bitertanol (C20H23N302, m/z 338.1869, 6.77 min)
√ Boscalid (C18H12Cl2N20, m/z 343.0405, 6.46 min)
√e Carbofuran (C12H15NO3, m/z 222.1130, Transition m/z 123.0446, 4.51 min)
√ Chlorfenvinphos (C12H14Cl304P, m/z 358.9774, Transition m/z 330.9824, 7.28 min)
√ Chloridazon (C10H8ClN30, m/z 222.0434, 2.69 min)
√ Cyprodinil (C14H15N3, m/z 226.1344, 6.51 min)
√e difenoconazole (C19H17Cl2N3O3, m/z 406.0725, Transition m/z 251.0030, 7.50 min)
√e Ethoprophos (C8H19O2PS2, m/z 243.0642, Transition m/z 96.9513, 6.53 min)
√ fenpropimorph (C20H33NO, m/z 304.2640, 5.45 min)
x fludioxonil (C12H6F2N2O2, m/z 249.0476, Transition m/z 229.0413, 5.90 min)
√e flufenacet (C14H13F4N3025, m/z 364.0743, Transition m/z 194.0981, 7.02 min)
√ Flurtamone (C18H14F3NO2, m/z 334.1055, 6.06 min)
√e Imidacloprid (C9H10ClNSO2, m/z 256.0601, Transition m/z 209.0594, 2.72 min)
√e 371, (2.70 min), Area 197.6, 0.19 mDa, i-FIT Conf 0.2%, (5/100)
√e Isoproturon (C12H18N20, m/z 207.1497, Transition m/z 165.1028, 5.03 min)
√e Kresoxim-methyl (C11H11NO3, m/z 206.0817, Transition m/z 282.1130, 7.39 min)
√e Metamitron (C10H10N4O, m/z 203.0933, Transition m/z 175.0984, 2.50 min)
?e Metazachlor (C14H16ClN3O, m/z 278.1060, Transition m/z 242.1293, 5.41 min)
√e Methamidophos (C2H8NO2PS, m/z 142.0092, Transition m/z 124.9826, 0.93 min)
√e Methidathion Na (C6H11N2O4PS3, m/z 302.9697, Transition m/z 85.0402, 5.90 min)
√e Methomyl (C3H5NS, m/z 88.0221, Transition m/z 128.0146, 1.82 min)
? Oxamyl (C2H5N202, m/z 90.0429, 1.67 min)
√ Phosalone (C12H15ClNO4PS2, m/z 367.9947, Transition m/z 322.0070, 8.06 min)
√e Propiconazole (C15H17Cl2N302, m/z 342.0776, Transition 158.9761, 7.07 min)
√e Prosulfocarb (C14H21NOS, m/z 252.1422, Transition m/z 91.0548, 8.42 min)
√ pyraclostrobin (C19H18ClN3O4, m/z 388.1064, 7.82 min)
√ Quinmerac (C11H8ClNO2, m/z 222.0322, 2.59 min)
√ Tebuconazole (C16H22ClN3O, m/z 308.1530, Transition m/z 124.9794, 6.72 min)
√ terbufos (C9H21O2PS3, m/z 289.0520, Transition m/z 187.0016, 7.16 min)
√e Terbuthylazine (C9H16ClN5, m/z 230.1172, Transition m/z 174.0546, 5.94 min)
√ Triazoxid (C10H6ClN5O, m/z 248.0339, 4.03 min)
√e trifloxystrobin (C20H19F3N2O4, m/z 409.1375, Transition m/z 186.0531, 8.34 min)
? Abamectine (C48H71O14Na, m/z 895.4820, 9.69 min)
x Azocyclotin (C20H35N35n, m/z 430.1957, 10.93 min)
√ Chlormequat (C5H12ClN, m/z 122.0737, 0.62 min)
√ 82, (0.61 min), Area 950.3, 0.46 mDa, i-FIT Conf 100.0% (1/18)
√ Diflufenican (C19H11F5N2O2, m/z 395.0819, 8.17 min)

FIG. 11b

35 Positive; 4 Tentative: 2 Negative

√e Aldicarb (C5H9NS, m/z 116.0534, Transition m/z 116.0534, 3.57 min)
√e Azoxystrobin (C22H17N305, m/z 404.1246, Transition m/z 329.0804, 6.34 min)
?e Azinphos-methyl (C8H5NO, m/z 132.0449, Transition m/z 160.0511, 5.96 min)
√ Bitertanol (C20H23N302, m/z 338.1869, 6.77 min)
√ Boscalid (C18H12Cl2N20, m/z 343.0405, 6.46 min)
√e Carbofuran (C12H15NO3, m/z 222.1130, Transition m/z 123.0446, 4.51 min)
√ Chlorfenvinphos (C12H14Cl304P, m/z 358.9774, Transition m/z 330.9824, 7.28 min)
√ Chloridazon (C10H8C1N3O, m/z 222.0434, 2.69 min)
√ Cyprodinil (C14H15N3, m/z 226.1344, 6.51 min)
√e difenoconazole (C19H17Cl2N3O3, m/z 406.0725, Transition m/z 251.0030, 7.50 min)
√e Ethoprophos (C8H19O2PS2, m/z 243.0642, Transition m/z 96.9513, 6.53 min)
√ fenpropimorph (C20H33NO, m/z 304.2640, 5.45 min)
x fludioxonil (C12H6F2N2O2, m/z 249.0476, Transition m/z 229.0413, 5.90 min)
√e flufenacet (C14H13F4N3O25, m/z 364.0743, Transition m/z 194.0981, 7.02 min)
√e 961, (6.98 min), Area 431.2, 0.60 mDa, i-FIT Conf 81.1% (1/100)
? 982, (7.12 min), Area 1.3, 3.64 mDa, i-FIT Conf 1.2%, (29/100)
√ Flurtamone (C18H14F3NO2, m/z 334.1055, 6.06 min)
√e Imidacloprid (C9H10ClN5O2, m/z 256.0601, Transition m/z 209.0594, 2.72 min)
√e Isoproturon (C12H18N20, m/z 207.1497, Transition m/z 165.1028, 5.03 min)
√e Kresoxim-methyl (C11H11NO3, m/z 206.0817, Transition m/z 282.1130, 7.39 min)
√e Metamitron (C10H10N4O, m/z 203.0933, Transition m/z 175.0984, 2.50 min)
?e Metazachlor (C14H16ClN3O, m/z 278.1060, Transition m/z 242.1293, 5.41 min)
√e Methamidophos (C2H8NO2PS, m/z 142.0092, Transition m/z 124.9826, 0.93 min)
√e Methidathion Na (C6H11N2O4PS3, m/z 302.9697, Transition m/z 85.0402, 5.90 min)
√e Methomyl (C3H5NS, m/z 88.0221, Transition m/z 128.0146, 1.82 min)
? Oxamyl (C2H5N2O2, m/z 90.0429, 1.67 min)
√ Phosalone (C12H15ClNO4PS2, m/z 367.9947, Transition m/z 322.0070, 8.06 min)
√e Propiconazole (C15H17Cl2N302, m/z 342.0776, Transition 158.9761, 7.07 min)
√e Prosulfocarb (C14H21NOS, m/z 252.1422, Transition m/z 91.0548, 8.42 min)
√ pyraclostrobin (C19H18ClN304, m/z 388.1064, 7.82 min)
√ Quinmerac (C11H8ClNO2, m/z 222.0322, 2.59 min)
√ Tebuconazole (C16H22ClN3O, m/z 308.1530, Transition m/z 124.9794, 6.72 min)
√ terbufos (C9H21O2PS3, m/z 289.0520, Transition m/z 187.0016, 7.16 min)
√e Terbuthylazine (C9H16ClN5, m/z 230.1172, Transition m/z 174.0546, 5.94 min)
√ Triazoxid (C10H6ClN5O, m/z 248.0339, 4.03 min)
√e trifloxystrobin (C20H19F3N2O4, m/z 409.1375, Transition m/z 186.0531, 8.34 min)
? Abamectine (C48H71O14Na, m/z 895.4820, 9.69 min)
x Azocyclotin (C20H35N3Sn, m/z 430.1957, 10.93 min)
√ Chlormequat (C5H12ClN, m/z 122.0737, 0.62 min)
√ Diflufenican (C19H11F5N2O2, m/z 395.0819, 8.17 min)
√ Epoxiconazole (C17H13ClFN3O, m/z 330.0809, 6.43 min)

FIG. 12b

35 Positive; 4 Tentative: 2 Negative

√e Aldicarb (C5H9NS, m/z 116.0534, Transition m/z 116.0534, 3.57 min)
√e Azoxystrobin (C22H17N305, m/z 404.1246, Transition m/z 329.0804, 6.34 min)
?e Azinphos-methyl (C8H5NO, m/z 132.0449, Transition m/z 160.0511, 5.96 min)
√ Bitertanol (C20H23N302, m/z 338.1869, 6.77 min)
√ Boscalid (C18H12Cl2N20, m/z 343.0405, 6.46 min)
√e Carbofuran (C12H15NO3, m/z 222.1130, Transition m/z 123.0446, 4.51 min)
√ Chlorfenvinphos (C12H14Cl304P, m/z 358.9774, Transition m/z 330.9824, 7.28 min)
√ Chloridazon (C10H8ClN30, m/z 222.0434, 2.69 min)
√ Cyprodinil (C14H15N3, m/z 226.1344, 6.51 min)
√e difenoconazole (C19H17Cl2N3O3, m/z 406.0725, Transition m/z 251.0030, 7.50 min)
√e Ethoprophos (C8H19O2PS2, m/z 243.0642, Transition m/z 96.9513, 6.53 min)
√ fenpropimorph (C20H33NO, m/z 304.2640, 5.45 min)
x fludioxonil (C12H6F2N2O2, m/z 249.0476, Transition m/z 229.0413, 5.90 min)
√e flufenacet (C14H13F4N3025, m/z 364.0743, Transition m/z 194.0981, 7.02 min)
√e 961, (6.98 min), Area 431.2, 0.60 mDa, i-FIT Conf 81.1% (1/100)
? 982, (7.12 min), Area 1.3, 3.64 mDa, i-FIT Conf 1.2%, (29/100)
√ Flurtamone (C18H14F3NO2, m/z 334.1055, 6.06 min)
√e Imidacloprid (C9H10ClN502, m/z 256.0601, Transition m/z 209.0594, 2.72 min)
√e Isoproturon (C12H18N20, m/z 207.1497, Transition m/z 165.1028, 5.03 min)
√e Kresoxim-methyl (C11H11NO3, m/z 206.0817, Transition m/z 282.1130, 7.39 min)
√e Metamitron (C10H10N4O, m/z 203.0933, Transition m/z 175.0984, 2.50 min)
?e Metazachlor (C14H16ClN3O, m/z 278.1060, Transition m/z 242.1293, 5.41 min)
√e Methamidophos (C2H8NO2PS, m/z 142.0092, Transition m/z 124.9826, 0.93 min)
√e Methidathion Na (C6H11N2O4PS3, m/z 302.9697, Transition m/z 85.0402, 5.90 min)
√e Methomyl (C3H5NS, m/z 88.0221, Transition m/z 128.0146, 1.82 min)
? Oxamyl (C2H5N202, m/z 90.0429, 1.67 min)
√ Phosalone (C12H15ClNO4PS2, m/z 367.9947, Transition m/z 322.0070, 8.06 min)
√e Propiconazole (C15H17Cl2N302, m/z 342.0776, Transition 158.9761, 7.07 min)
√e Prosulfocarb (C14H21NOS, m/z 252.1422, Transition m/z 91.0548, 8.42 min)
√ pyraclostrobin (C19H18ClN304, m/z 388.1064, 7.82 min)
√ Quinmerac (C11H8ClNO2, m/z 222.0322, 2.59 min)
√ Tebuconazole (C16H22ClN3O, m/z 308.1530, Transition m/z 124.9794, 6.72 min)
√ terbufos (C9H21O2PS3, m/z 289.0520, Transition m/z 187.0016, 7.16 min)
√e Terbuthylazine (C9H16ClN5, m/z 230.1172, Transition m/z 174.0546, 5.94 min)
√ Triazoxid (C10H6ClN5O, m/z 248.0339, 4.03 min)
√e trifloxystrobin (C20H19F3N2O4, m/z 409.1375, Transition m/z 186.0531, 8.34 min)
? Abamectine (C48H71O14Na, m/z 895.4820, 9.69 min)
x Azocyclotin (C20H35N3Sn, m/z 430.1957, 10.93 min)
√ Chlormequat (C5H12ClN, m/z 122.0737, 0.62 min)
√ Diflufenican (C19H11F5N2O2, m/z 395.0819, 8.17 min)
√ Epoxiconazole (C17H13ClFN3O, m/z 330.0809, 6.43 min)

FIG. 13b

METHOD OF SCREENING A SAMPLE FOR THE PRESENCE OF ONE OR MORE KNOWN COMPOUNDS OF INTEREST AND A MASS SPECTROMETER PERFORMING THIS METHOD

CROSS-REFERENCE TO RELATED APPLICATION

This application represents a National Stage of International Application No. PCT/GB2010/001688 filed on 6 Sep. 2010 which claims priority from and the benefit of U.S. Provisional Patent Application Ser. No. 61/245,401 filed on 24 Sep. 2009 and United Kingdom Patent Application No. 0915474.1 filed on 4 Sep. 2009. The entire contents of these applications are incorporated herein by reference.

BACKGROUND TO THE PRESENT INVENTION

The present invention relates to a method of screening a sample for the presence of one or more known compounds of interest, a method of mass spectrometry and a mass spectrometer.

Tandem mass spectrometry (MS/MS) is the name given to the method of mass spectrometry wherein parent or precursor ions generated from a sample are selected by a first mass filter/analyser and are then passed to a collision cell wherein they are fragmented by collisions with neutral gas molecules to yield daughter or product ions. The fragment or daughter ions are then mass analysed by a second mass filter/analyser and the resulting fragment or daughter ion spectra can be used to determine the structure and hence identify the parent or precursor ion. Tandem mass spectrometry is particularly useful for the analysis of complex mixtures such as biomolecules since it avoids the need for chemical clean-up prior to mass spectral analysis.

A common requirement is to screen and quantify a particular sample for unwanted contamination, often to ensure compliance with government legislation. A wide variety of matrixes and contaminants are often searched. For example, tests may be carried out for pesticides, markers relating to the place of origin of food, food safety (biological and chemical), peptides/proteins and environmental contaminants (e.g. water contamination from industrial processes). Such tests are commonly performed using tandem quadrupole instruments. However, as the requirement for the number of compounds to be screened increases then the duty cycle decreases. In addition, it is common now to require multiple fragment ions from a parent or precursor ion as further confirmation of the presence of the targeted compounds. Also, it is desirable to be able to re-examine the data for possible co-eluting interferences. Often the screen is performed in two stages. An acquisition is first performed using a Time of Flight mass spectrometer that searches for the required compounds on the basis of the accurate mass or mass to charge ratio of the parent ion from the compound. If the compound if found then the compound is confirmed and quantified using Multiple Reacting Monitoring ("MRM") using a tandem quadrupole instrument.

Another type of mass spectrometer referred to as a hybrid quadrupole-Time of Flight mass spectrometer is known wherein the second quadrupole mass filter/analyser is replaced by an orthogonal acceleration Time of Flight mass analyser.

It is known that these types of mass spectrometers when used to perform conventional methods of obtaining fragment or daughter ion spectrum of a candidate parent or precursor ion suffer from low duty cycles which render them unsuitable for use in applications which require a higher duty cycle such as on-line chromatography applications.

It is also known that the duty cycle of a hybrid quadrupole-Time of Flight mass spectrometers may be improved significantly by cycling the collision device between a fragmenting mode of operation and a non-fragmenting mode of operation.

Hybrid quadrupole-Time of Flight mass spectrometers are also known have incorporated ion mobility separation devices within them allowing a further degree of selectivity based upon size shape and charge of the ion.

It is desired to improve known methods of screening a sample for known compounds.

SUMMARY OF THE PRESENT INVENTION

According to an aspect of the present invention there is provided a method of screening a sample for the presence of one or more known compounds of interest comprising:

providing a mass spectrometer comprising a fragmentation device and a mass analyser;

repeatedly switching the fragmentation device between a first mode of operation and a second mode of operation, wherein in the first mode of operation parent ions are not substantially fragmented within the fragmentation device or are arranged to bypass the fragmentation device and are then subsequently mass analysed by the mass analyser and wherein in the second mode of operation parent ions are substantially fragmented within the fragmentation device to form a plurality of fragment ions which are then subsequently mass analysed by the mass analyser;

determining if a candidate parent ion of interest (M1) is present in a first data set obtained when the fragmentation device was operated in the first mode of operation; and determining if one or more corresponding fragment ions of interest (M2, M3, M4 . . . ) are present in a second data set obtained immediately before or after the first data set;

wherein if the candidate parent ion of interest (M1) is determined to be present in the first data set and one or more corresponding fragment ions of interest (M2, M3, M4 . . . ) are also determined to be present in the second data set then the method further comprises determining whether or not the candidate parent ion of interest (M1) and the one or more fragment ions of interest (M2, M3, M4 . . . ) have substantially similar elution or retention times and/or ion mobility drift times.

According to a less preferred embodiment the fragmentation device may comprise a reaction device.

According to another aspect of the present invention there is provided a method of screening a sample for the presence of one or more known compounds of interest comprising:

providing a mass spectrometer comprising a fragmentation device and a mass analyser;

repeatedly switching the fragmentation device between a first mode of operation and a second mode of operation, wherein in the first mode of operation parent ions are not substantially fragmented within the fragmentation device or are arranged to bypass the fragmentation device and are then subsequently mass analysed by the mass analyser and wherein in the second mode of operation parent ions are substantially fragmented within the fragmentation device to form a plurality of fragment ions which are then subsequently mass analysed by the mass analyser;

determining if one or more fragment ions of interest (M2, M3, M4 . . . ) are present in a second data set obtained when second fragmentation device was operated in the second mode of operation; and determining if a corresponding candidate parent ion of interest (M1) is present in a first data set obtained when the fragmentation device was operated in the first mode of operation immediately before or after the second data set;

wherein if the one or more fragment ions of interest (M2, M3, M4 . . .) are determined to be present in the second data set and the corresponding candidate parent ion of interest (M1) is also determined to be present in the first data set and then the method further comprises determining whether or not the candidate parent ion of interest (M1) and the one or more fragment ions of interest (M2, M3, M4 . . .) have substantially similar elution.or retention times and/or ion mobility drift times.

According to a less preferred embodiment the fragmentation device may comprise a reaction device.

The mass analyser preferably comprises a Time of Flight mass analyser, a Fourier Transform Ion Cyclotron Resonance mass analyser or an electrostatic orbital mass analyser. Other embodiments are contemplated wherein the mass analyser may comprise a different form of mass analyser.

The elution or retention time preferably comprises the elution or retention time from a chromatographic column.

The ion mobility drift times preferably correspond with the ion mobility drift times of ions through an ion mobility spectrometer or separator arranged upstream of the fragmentation device.

The fragmentation device preferably comprises a Collision Induced Dissociation fragmentation device, an Electron Transfer Dissociation fragmentation device, an Electron Capture Dissociation fragmentation device or a Surface Induced Dissociation fragmentation device.

According to the preferred embodiment the fragmentation device is preferably repeatedly switched, or bypassed, between the first and second modes during a single experimental run or during a single analysis of a sample.

According to an embodiment the fragmentation device may comprise an Electron Capture Dissociation ("ECD") device. Electrons are preferably confined by a magnetic field and ions to be fragmented are preferably confined within an ion guide. An AC or RF voltage is preferably applied to the electrodes of the ion guide in order to create a radial pseudo-potential field or well which preferably acts to confine ions radially within the ion guide. Relatively low energy electrons are preferably confined by a relatively strong magnetic field and the magnetic field and the ion guiding region of the ion guide are preferably overlapped or superimposed so that multiply charged analyte ions are caused to interact with the relatively low energy electrons. Fragmentation of ions by Electron Capture Dissociation preferably does not involve causing internal vibrational energy to be introduced to the ions. In the second (fragmentation) mode of operation the electrons are preferably arranged to have an energy selected from the group consisting of: (i)<1 eV; (ii) 1-2 eV; (iii) 2-3 eV; (iv) 3-4 eV; and (v) 4-5 eV. Less preferably the electrons may be arranged to have an energy>5 eV in the second (fragmentation) mode of operation.

An electron source is preferably provided and in the second mode of operation the electron source preferably generates a plurality of electrons which are preferably arranged to interact with the parent or precursor ions. In the first mode of operation the electron source is preferably switched OFF so that analyte ions preferably do not interact with any electrons and hence preferably are not caused to fragment.

The term "fragmentation device" should be construed broadly as meaning a fragmentation, collision or reaction device. According to a less preferred embodiment ions may be arranged to react within the fragmentation device but without being caused to fragment per se.

According to embodiments of the present invention the fragmentation device may comprise a fragmentation device or reaction device selected from the group consisting of: (i) an Electron Collision or Impact Dissociation fragmentation device; (ii) a Photo Induced Dissociation ("PID") fragmentation device; (iii) a Laser Induced Dissociation fragmentation device; (iv) an infrared radiation induced dissociation device; (v) an ultraviolet radiation induced dissociation device; (vi) a nozzle-skimmer interface fragmentation device; (vii) an in-source fragmentation device; (viii) an ion-source Collision Induced Dissociation fragmentation device; (ix) a thermal or temperature source fragmentation device; (x) an electric field induced fragmentation device; (xi) a magnetic field induced fragmentation device; (xii) an enzyme digestion or enzyme degradation fragmentation device; (xiii) an ion-ion reaction fragmentation device; (xiv) an ion-molecule reaction fragmentation device; (xv) an ion-atom reaction fragmentation device; (xvi) an ion-metastable ion reaction fragmentation device; (xvii) an ion-metastable molecule reaction fragmentation device; (xviii) an ion-metastable atom reaction fragmentation device; (xix) an ion-ion reaction device for reacting ions to form adduct or product ions; (xx) an ion-molecule reaction device for reacting ions to form adduct or product ions; (xxi) an ion-atom reaction device for reacting ions to form adduct or product ions; (xxii) an ion-metastable ion reaction device for reacting ions to form adduct or product ions; (xxiii) an ion-metastable molecule reaction device for reacting ions to form adduct or product ions; and (xxiv) an ion-metastable atom reaction device for reacting ions to form adduct or product ions.

A reaction device should be understood as comprising a device wherein ions, atoms or molecules are rearranged or reacted so as to form a new species of ion, atom or molecule. An X-Y reaction fragmentation device should be understood as meaning a device wherein X and Y combine to form a product which then fragments. This is different to a fragmentation device per se wherein ions may be caused to fragment without first forming a product. An X-Y reaction device should be understood as meaning a device wherein X and Y combine to form a product and wherein the product does not necessarily then fragment.

According to another embodiment the fragmentation (or reaction device) may comprise a Surface Induced Dissociation fragmentation device or a Collision Induced Dissociation fragmentation device. Collision Induced Dissociation can be viewed as being a relatively slow process in that fragmentation is often the result of multiple collisions between ions and gas molecules. As a result, fragmentation tends to be averaged out and a relatively broad range of fragmentation products are typically observed. In contrast, Surface Induced Dissociation can be viewed as being a relatively sudden or instantaneous process. In the second (fragmentation) mode of operation the parent or precursor ions may be directed, diverted or deflected on to a surface or target plate. In the first (non-fragmentation) mode of operation the parent or precursor ions are preferably not directed, diverted or deflected on to the surface or target plate i.e. the ions may preferably be onwardly transmitted through or past the Surface Induced Dissociation fragmentation device without being diverted and without being caused to fragment.

If the candidate parent ion of interest (M1) and the one or more fragment ions of interest (M2, M3, M4 . . .) are determined to have substantially different elution or retention times and/or ion mobility drift times then the candidate parent ion of interest (M1) is preferably rejected, downgraded in status or reduced in significance as a candidate parent ion of interest.

If the candidate parent ion of interest (M1) is determined to have a lower charge state that one or more of the corresponding fragment ions of interest (M2, M3, M4 . . . ) then the candidate parent ion of interest (M1) is preferably rejected, downgraded in status or reduced in significance as a candidate parent ion of interest.

If the candidate parent ion of interest (M1) is determined to have an unexpected isotopic distribution then the candidate parent ion of interest (M1) is preferably rejected, downgraded in status or reduced in significance as a candidate parent ion of interest.

If fragment ions of interest (M2, M3, M4 . . . ) corresponding with the candidate parent ion of interest (M1) are determined to have an unexpected isotopic distribution then the candidate parent ion of interest (M1) is preferably rejected, downgraded in status or reduced in significance as a candidate parent ion of interest.

If the candidate parent ion of interest (M1) and/or corresponding fragment ions of interest (M2, M3, M4 . . . ) are determined to have an elution or retention time falling outside of an expected time window or expected range then the candidate parent ion of interest (M1) is preferably rejected, downgraded in status or reduced in significance as a candidate parent ion of interest.

If the candidate parent ion of interest (M1) and/or corresponding fragment ions of interest (M2, M3, M4 . . . ) are determined to have an ion mobility drift time falling outside of an expected time window or expected range then the candidate parent ion of interest (M1) is preferably rejected, downgraded in status or reduced in significance as a candidate parent ion of interest.

If the ratio of the intensity of the candidate parent ion of interest (M1) to one or more of the fragment ions of interest (M2, M3, M4 . . . ) falls outside an expected range then the candidate parent ion of interest (M1) is preferably rejected, downgraded in status or . reduced in significance as a candidate parent ion of interest.

If the candidate parent ion of interest (M1) and the one or more fragment ions of interest (M2, M3, M4 . . . ) are determined to have substantially similar elution or retention times and/or ion mobility drift times then a determination is preferably made that a known compound of interest is present in the sample.

If the ratio of the intensity of the candidate parent ion of interest (M1) to one or more of the fragment ions of interest (M2, M3, M4 . . . ) falls within an expected range then a determination is preferably made that a known compound of interest is present in the sample.

According to the preferred embodiment candidate parent ions of interest and one or more fragment ions of interest are preferably checked to see that they have both substantially the same elution or drift time and also the observed parent ion to fragment ion intensity ratio is checked as additional confirmation that the candidate parent ion of interest is indeed indicative that the compound which is being screened for is present within the sample.

According to the preferred embodiment the method further comprises determining the intensity of or quantifying the known compound of interest. The step of determining the intensity of or quantifying the known compound of interest preferably further comprises either: (i) summing the intensity of an isotopic distribution of the parent ion of interest; and/or (ii) summing the intensity of all fragment ions which correspond with the parent ion of interest.

According to another aspect of the present invention there is provided a mass spectrometer comprising:

a fragmentation device;

a mass analyser; and a control system arranged and adapted:

(i) to switch repeatedly the fragmentation device between a first mode of operation and a second mode of operation, wherein in the first mode of operation parent ions are not substantially fragmented within the fragmentation device or are arranged to bypass the fragmentation device and are then subsequently mass analysed by the mass analyser and wherein in the second mode of operation parent ions are substantially fragmented within the fragmentation device to form a plurality of fragment ions which are then subsequently mass analysed by the mass analyser;

(ii) to determine if a candidate parent ion of interest (M1) is present in a first data set obtained when the fragmentation device was operated in the first mode of operation; and (iii) to determine if one or more corresponding fragment ions of interest (M2, M3, M4 . . . ) are present in a second data set obtained immediately before or after the first data set;

(iv) wherein if the candidate parent ion of interest (M1) is determined to be present in the first data set and one or more corresponding fragment ions of interest (M2, M3, M4 . . . ) are also determined to be present in the second data set then the control system further determines whether or not the candidate parent ion of interest (M1) and the one or more fragment ions of interest (M2, M3, M4 . . . ) have substantially similar elution or retention times and/or ion mobility drift times.

According to another aspect of the present invention there is provided a mass spectrometer comprising:

a fragmentation device;

a mass analyser; and a control system arranged and adapted:

(i) to switch repeatedly the fragmentation device between a first mode of operation and a second mode of operation, wherein in the first mode of operation parent ions are not substantially fragmented within the fragmentation device or are arranged to bypass the fragmentation device and are then subsequently mass analysed by the mass analyser and wherein in the second mode of operation parent ions are substantially fragmented within the fragmentation device to form a plurality of fragment ions which are then subsequently mass analysed by the mass analyser;

(ii) to determine if one or more fragment ions of interest (M2, M3, M4 . . . ) are present in a second data set obtained when second fragmentation device was operated in the second mode of operation;

(iii) to determine if a corresponding candidate parent ion of interest (M1) is present in a first data set obtained when the fragmentation device was operated in the first mode of operation immediately before or after the second data set; and (iv) wherein if the one or more fragment ions of interest (M2, M3, M4 . . . ) are determined to be present in the second data set and the corresponding candidate parent ion of interest (M1) is also determined to be present in the first data set and then the control system further determines whether or not the candidate parent ion of interest (M1) and the one or more fragment ions of interest (M2, M3, M4 . . . ) have substantially similar elution or retention times and/or ion mobility drift times.

According to another aspect of the present invention there is provided a method of mass spectrometry comprising:

mass analysing a sample and acquiring a parent ion data set and a fragment ion data set;

determining if a parent ion of interest is present in the parent ion data set and a corresponding fragment ion is present in the fragment ion data set;

wherein if the parent ion of interest and a corresponding fragment ion are preseht in the data sets then the method further comprises confirming whether or not the parent ion of interest and the corresponding fragment ion have: (i) substantially the same elution time; (ii) substantially the same ion mobility drift time; or (iii) substantially the same elution time and substantially the same ion mobility drift time.

According to another aspect of the present invention there is provided a mass spectrometer comprising:

a fragmentation device;

a mass analyser; and a control system arranged and adapted:

(i) to mass analyse a sample and acquire a parent ion data set and a fragment ion data set; and (ii) to determine if a parent ion of interest is present in the parent ion data set and a corresponding fragment ion is present in the fragment ion data set;

wherein if the control system determines that the parent ion of interest and a corresponding fragment ion are present in the data sets then the control system further confirms whether or not the parent ion of interest and the corresponding fragment ion have: (i) substantially the same elution time; (ii) substantially the same ion mobility drift time; or (iii) substantially the same elution time and substantially the same ion mobility drift time.

According to another aspect of the present invention there is provided a method of screening a sample for the presence of one or more known compounds of interest comprising:

providing a mass spectrometer comprising a fragmentation device and a mass analyser;

repeatedly obtaining parent ion and fragment ion mass spectral data;

determining if a candidate parent ion of interest (M1) is present in the parent ion mass spectral data; and determining if one or more corresponding fragment ions of interest (M2, M3, M4 . . . ) are present in the fragment ion mass spectral data;

wherein if the candidate parent ion of interest (M1) is determined to be present in the parent ion mass spectral data and one or more corresponding fragment ions of interest (M2, M3, M4 . . . ) are also determined to be present in the fragment ion mass spectral data then the method further comprises:

determining whether or not the candidate parent ion of interest (M1) and the one or more fragment ions of interest (M2, M3, M4 . . . ) have substantially similar elution or retention times and/or ion mobility drift times; and determining the ratio of the intensity of the candidate parent ion of interest (M1) to one or more of the fragment ions of interest (M2, M3, M4 . . . );

wherein if: (i) the candidate parent ion of interest (M1) and the one or more fragment ions of interest (M2, M3, M4 . . . ) are determined to have substantially similar elution or retention times and/or ion mobility drift times; and (ii) the ratio of the intensity of the candidate parent ion of interest (M1) to one or more of the fragment ions of interest (M2, M3, M4 . . . ) falls within a predetermined range; then a determination is made that a known compound of interest is present in the sample and the method further comprises quantifying the known compound of interest.

According to another aspect of the present invention there is provided a mass spectrometer comprising:

a fragmentation device;

a mass analyser; and a control system arranged and adapted:

(i) to obtain repeatedly parent ion and fragment ion mass spectral data;

(ii) to determine if a candidate parent ion of interest (M1) is present in the parent ion mass spectral data; and (iii) to determine if one or more corresponding fragment ions of interest (M2, M3, M4 . . . ) are present in the fragment ion mass spectral data;

wherein if the candidate parent ion of interest (M1) is determined to be present in the parent ion mass spectral data and one or more corresponding fragment ions of interest (M2, M3, M4 . . . ) are also determined to be present in the fragment ion mass spectral then the control system is further arranged and adapted to:

(iv) to determine whether or not the candidate parent ion of interest (M1) and the one or more fragment ions of interest (M2, M3, M4 . . . ) have substantially similar elution or retention times and/or ion mobility drift times; and (v) to determine the ratio of the intensity of the candidate parent ion of interest (M1) to one or more of the fragment ions of interest (M2, M3, M4 . . . );

wherein if: (i) the candidate parent ion of interest (M1) and the one or more fragment ions of interest (M2, M3, M4 . . . ) are determined to have substantially similar elution or retention times and/or ion mobility drift times; and (ii) the ratio of the intensity of the candidate parent ion of interest (M1) to one or more of the fragment ions of interest (M2, M3, M4 . . . ) falls within a predetermined range; then the control system determines that a known compound of interest is present in the sample and the control system is further arranged and adapted to quantify the known compound of interest.

The preferred method preferably involves automatically switching, altering or varying the collision, fragmentation or reaction device between at least the first mode and the second mode at least once every 0.1, 0.2, 0.3, 0.4, 0.5, 0.6, 0.7, 0.8, 0.9, 1, 2, 3, 4, 5, 6, 7, 8, 9 or 10 seconds.

More generally, such altering is preferably performed with sufficient frequency to temporally resolve features in a sample stream. For example, where the sample stream is associated with an eluting chromatography sample, the altering preferably occurs on a time scale less than the width of peaks in a chromatogram associated with the eluting sample. So, for example, if a chromatographic intensity peak is a few seconds in width, altering could optionally occur approximately ten times during the peak-time interval, giving an alteration period of a fraction of a second. In preferred embodiments, the rate of altering supports accurate time-alignment of observed precursor ions and product ions derived from compounds present in the chromatographic stream. Thus, a precursor ion and product ions derived from the precursor are readily associated with each other due to confirmation of time alignment provided by the above-described apparatus and methods.

SRM/MRM-type analyses may, according to the preferred embodiment, be obtained from a full data set of a sample, obtained, for example, by GC-MS or LC-MS. The full data set includes data collected from substantially all precursor ions produced from a sample stream, and from substantially all product ions produced from the precursor ions. Compound(s) of interest for monitoring can be selected after collection of data, in contrast to some prior methods which are implemented on tandem quadrupole apparatus.

The method may further comprise the step of ranking possible candidate parent or precursor ions according to the closeness of fit of their elution time with a predetermined fragment, product, daughter or adduct ion elution time.

A list of final candidate parent or precursor ions may be formed from the possible candidate parent or precursor ions by rejecting possible candidate parent or precursor ions if the elution time of a possible candidate parent or precursor ions precedes or exceeds the predetermined fragment, product, daughter or adduct ion elution time by more than a predetermined amount and/or closeness of fit of their ionic collision cross-section or mobility drift time.

In a preferred embodiment in addition to rejecting based upon elution time and/or mobility drift time, a potential parent or precursor ion may be rejected if additional confirmatory product or fragment ions are not present with the expected closeness of fit of elution time and/or closeness of fit of mobility drift time.

In a preferred embodiment in addition to rejecting based upon elution time and/or mobility drift time, a potential parent or precursor ion may be rejected if the precursor or parent ion isotope pattern does not match preset conditions.

In a preferred embodiment possible candidate parent or precursor ions may be ranked or scanned based upon a ranking system or scoring system based upon one or more of elution time goodness of fit, drift time closeness of fit, observation of confirmatory ions and their goodness of fit of their elution time and/or drift time, isotope ratios of parent or precursor and/or fragment and or confirmatory fragment ions.

Identification of (or confirmation of the presence of) parent or precursor ions may be achieved by making use of a combination of information. This may include the accurately determined mass or mass to charge ratio of the parent or precursor ion. It may also include the masses or mass to charge ratios of the fragment ions. In some instances the accurately determined masses or mass to charge ratios of the fragment, product, daughter or adduct ions may be preferred.

Fragment, product, daughter or adduct ions may be assigned to a candidate parent or precursor ion according to the closeness of fit of their elution times, and all fragment, product, daughter or adduct ions which have been associated with candidate parent or precursor ions may be listed.

The mass spectrometer preferably comprises an ion source. The ion source is preferably selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ("AP-MALDI") ion source; and (xviii) a Thermospray ion source.

According to a particularly preferred embodiment the ion source may comprise either an Electrospray, Atmospheric Pressure Chemical Ionization or a Matrix Assisted Laser Desorption Ionization ("MALDI") ion source. Such ion sources may be provided with an eluent over a period of time, the eluent having been separated from a mixture by means of liquid chromatography or capillary electrophoresis.

Alternatively, the ion source may comprise an Electron Impact, Chemical Ionization or Field Ionisation ion source. Such ion sources may be provided with an eluent over a period of time, the eluent having been separated from a mixture by means of gas chromatography.

A mass filter, preferably a quadrupole mass filter, may be provided upstream of the collision, fragmentation or reaction device. However, a mass filter is not essential to the present invention. The mass filter may be arranged to operate with a highpass filter characteristic.

According to an embodiment, a tandem quadrupole orthogonal acceleration Time of Flight mass spectrometer is used in a way in which candidate parent or precursor ions are discovered using a method in which sequential relatively low fragmentation or reaction mass spectra followed by relatively high fragmentation or reaction mass spectra are recorded. The switching back and forth of the collision, fragmentation or reaction device is preferably not interrupted. Instead a complete set of data is preferably acquired and this is then preferably post-processed. Fragment, product, daughter or adduct ions are preferably associated with parent or precursor ions by closeness of fit of their respective elution times. In this way candidate parent or precursor ions may be confirmed or rejected without interrupting the acquisition of data and information need not be lost.

Once an experimental run has been completed, the relatively high fragmentation or reaction mass spectra and the relatively low fragmentation or reaction mass spectra are then post-processed. Parent or precursor ions may be recognised by comparing a high fragmentation or reaction mass spectrum with a list of targeted fragment ions and their precursor and a low fragmentation or reaction mass spectrum obtained at substantially the same time with the corresponding precursor ions, and noting ions that meet the requirements of elution time window, drift time window, isotope ratio, and that additional conformational ions are present and meet the same elution criterion.

BRIEF DESCRIPTION OF THE DRAWINGS

Various embodiments of the present invention will now be described, by way of example only, together with other arrangements given for illustrative purposes only and with reference to the accompanying drawings in which.

DETAILED DESCRIPTION OF PREFERRED EMBODIMENT

Figure 1:
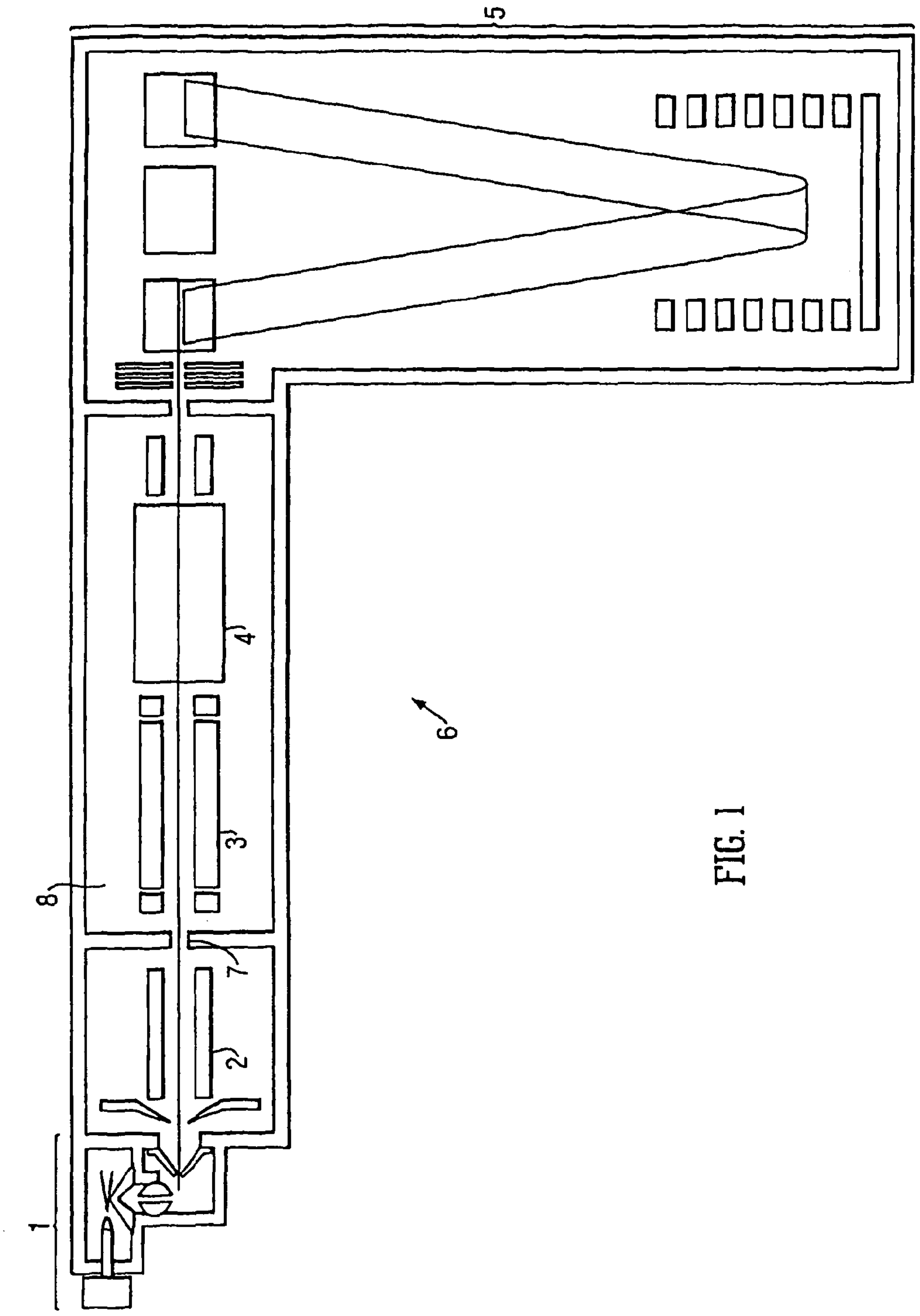
FIG. 1 is a schematic drawing of a mass spectrometer according to an embodiment of the present invention.
Figure 2:
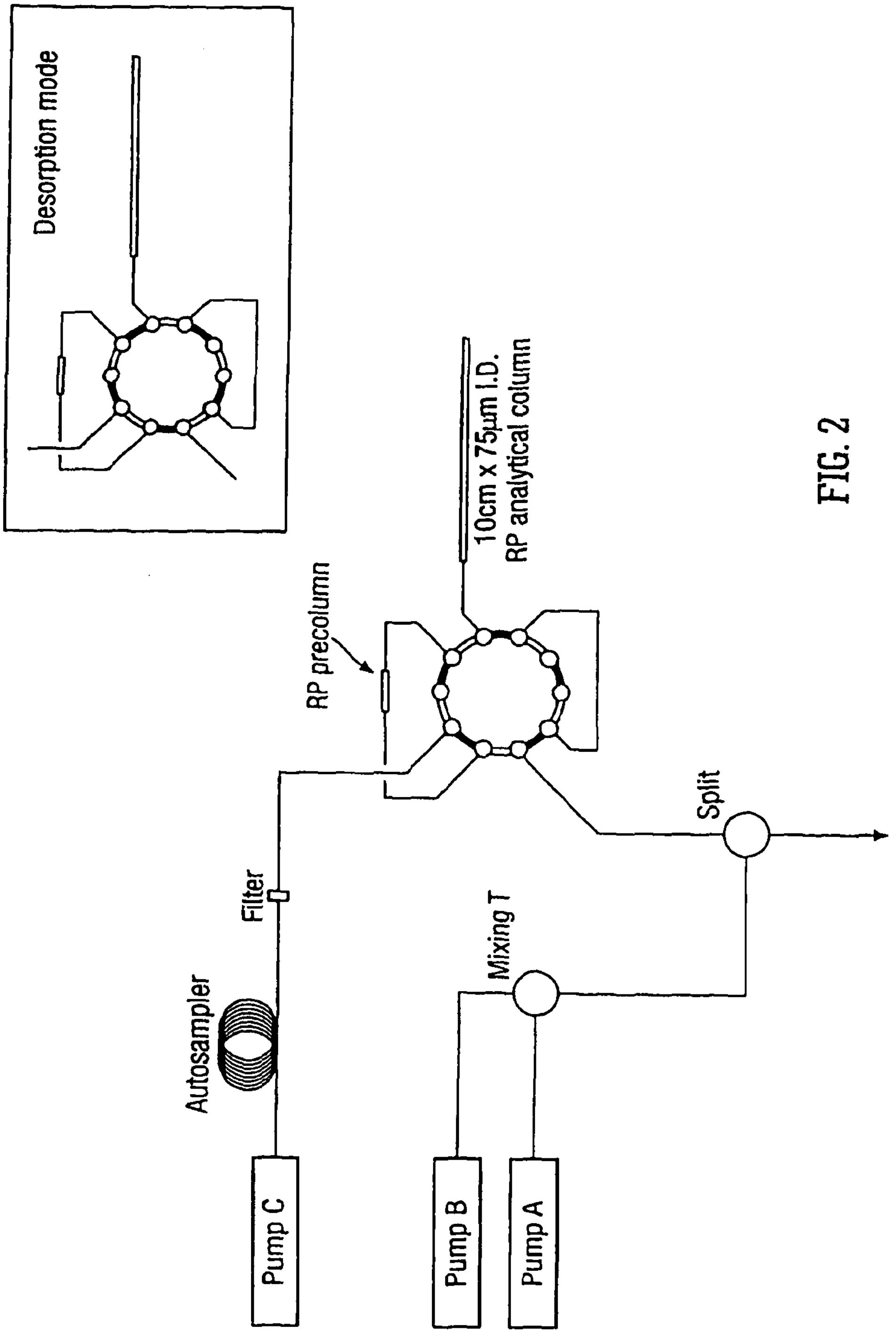
FIG. 2 shows a schematic of a valve switching arrangement during sample loading and desalting and the inset shows desorption of a sample from an analytical column.
Figure 3A:
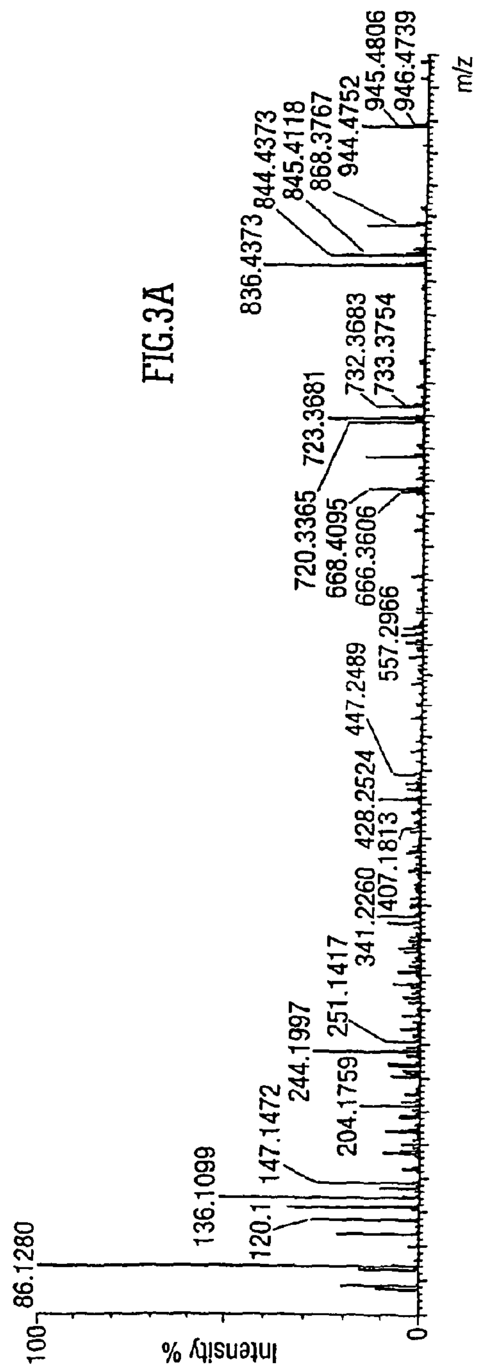
FIG. 3A shows a fragment or daughter ion mass spectrum and FIG. 3B shows a corresponding parent or precursor ion mass spectrum when a mass filter allowed parent or precursor ions having a mass to charge ratio greater than 350 to be transmitted.
Figure 3B:
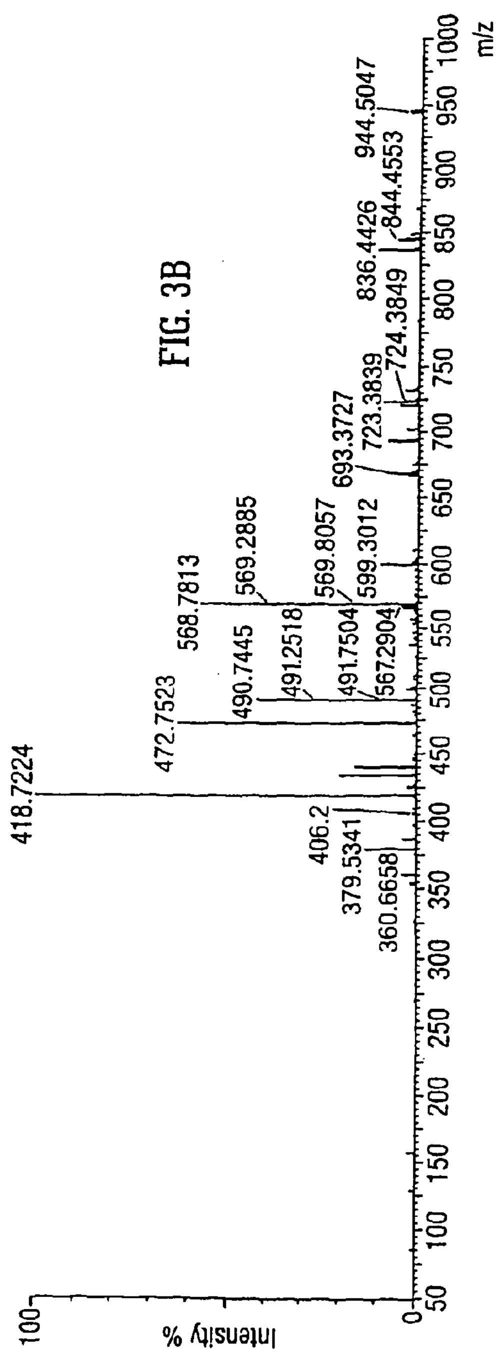
Figure 4A:
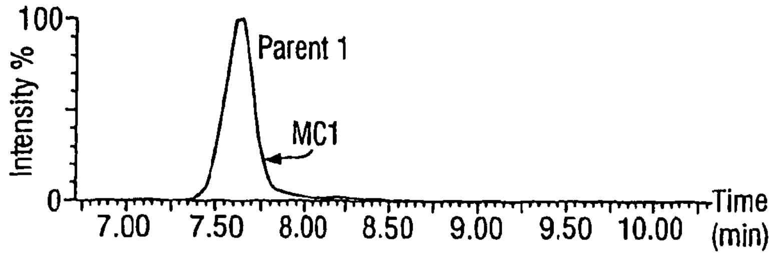
FIG. 4A shows a mass chromatogram showing the time profile of various mass ranges.
Figure 4B:
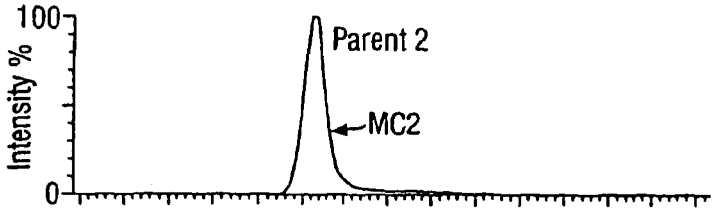
FIG. 4B shows a mass chromatogram showing the time profile of various mass ranges.
Figure 4C:
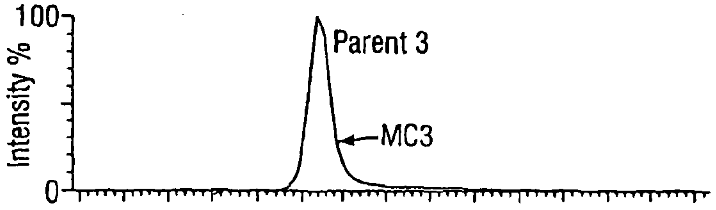
FIG. 4C shows a mass chromatogram showing the time profile of various mass ranges.
Figure 4D:
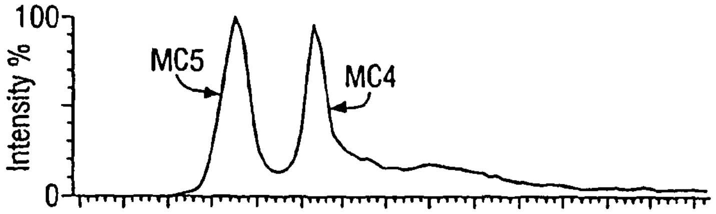
FIG. 4D shows a mass chromatogram showing the time profile of various mass ranges.
Figure 4E:
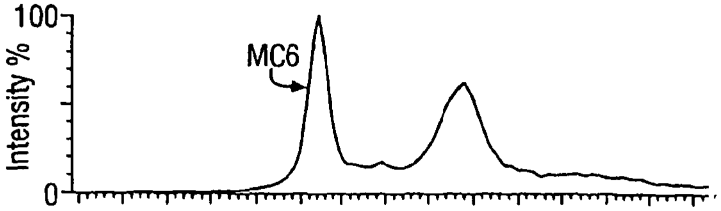
FIG. 4E shows a mass chromatogram showing the time profile of various mass ranges.
Figure 5:
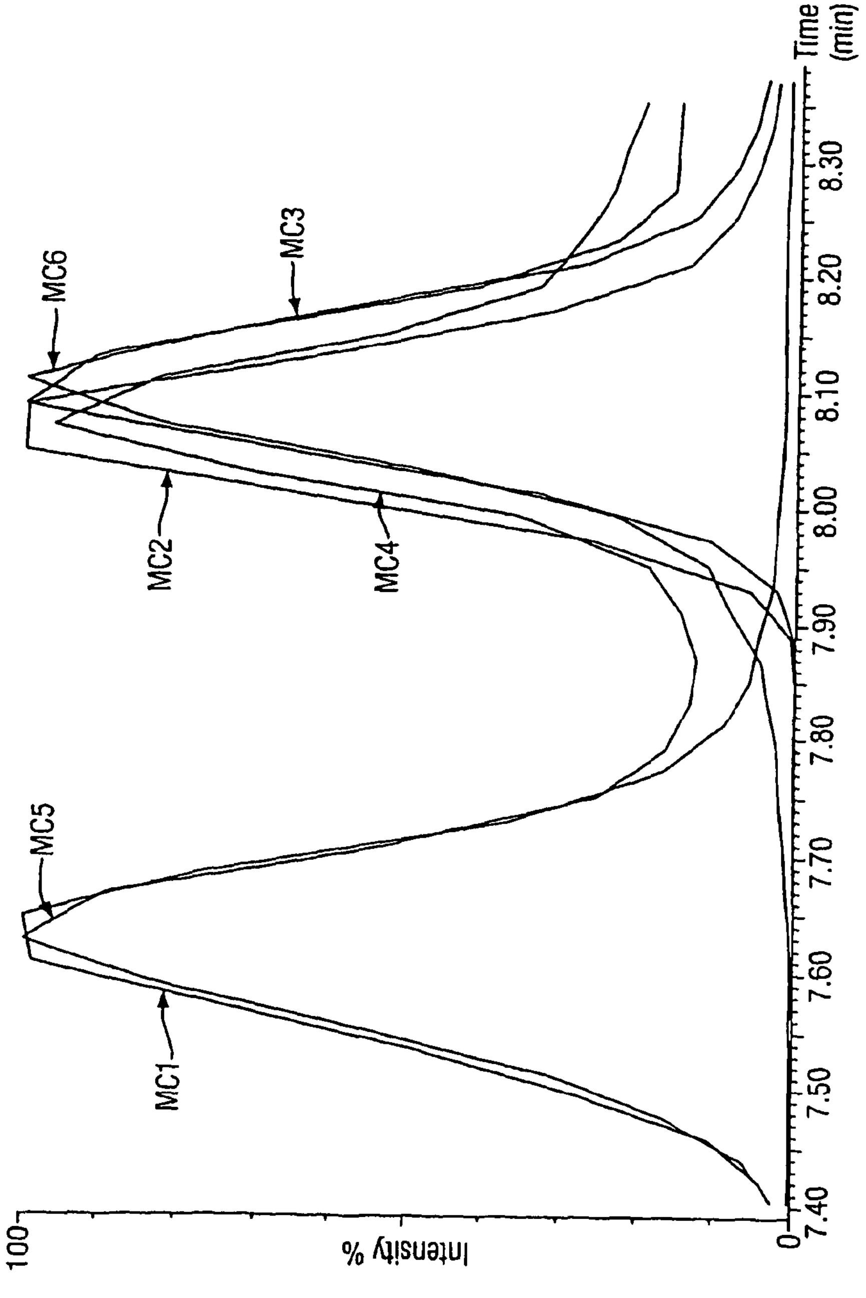
FIG. 5 shows the mass chromatograms of FIGS. 4A-4E superimposed upon one another.
Figure 6:
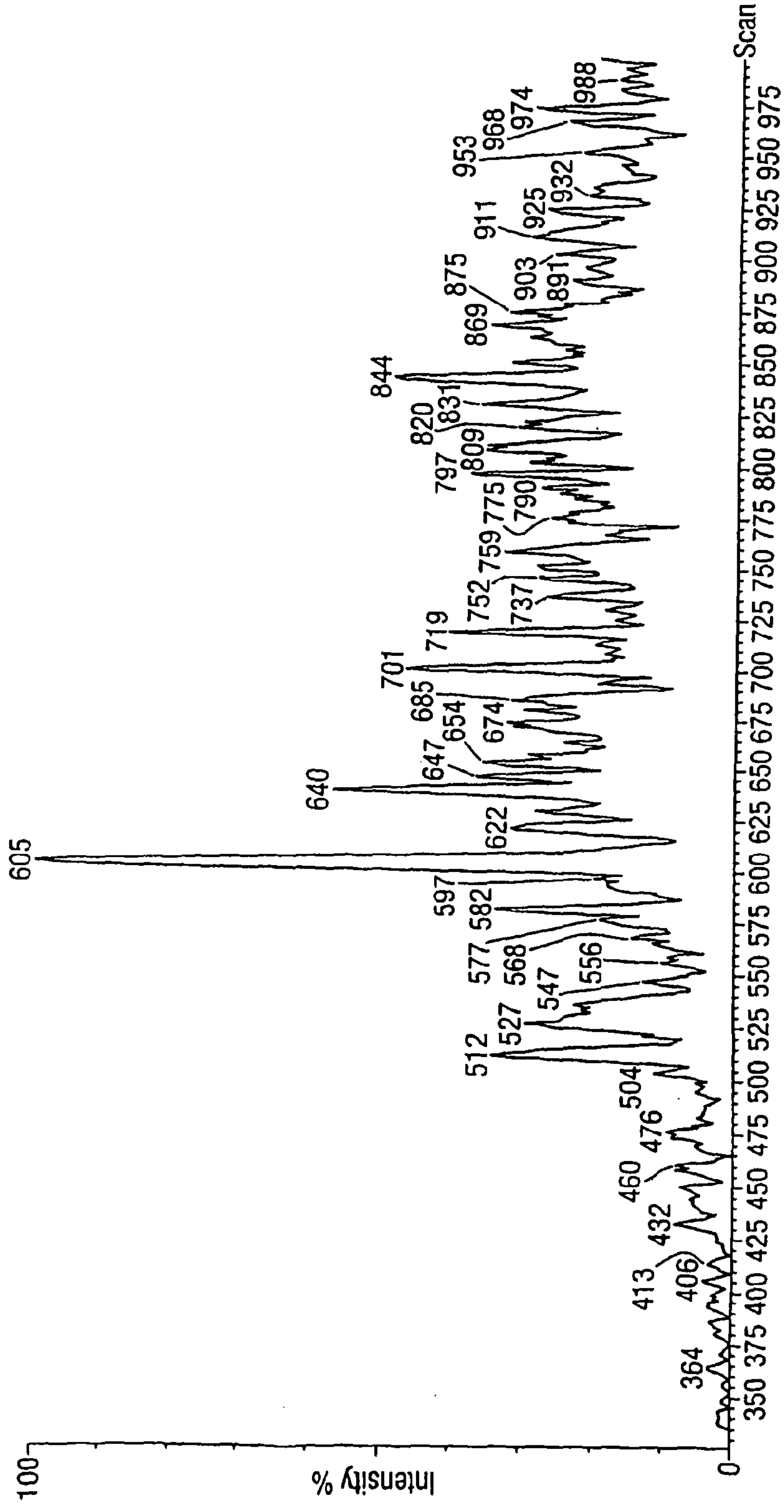
FIG. 6 shows a mass chromatogram of 87.04 (Asparagine immonium ion)
Figure 7:
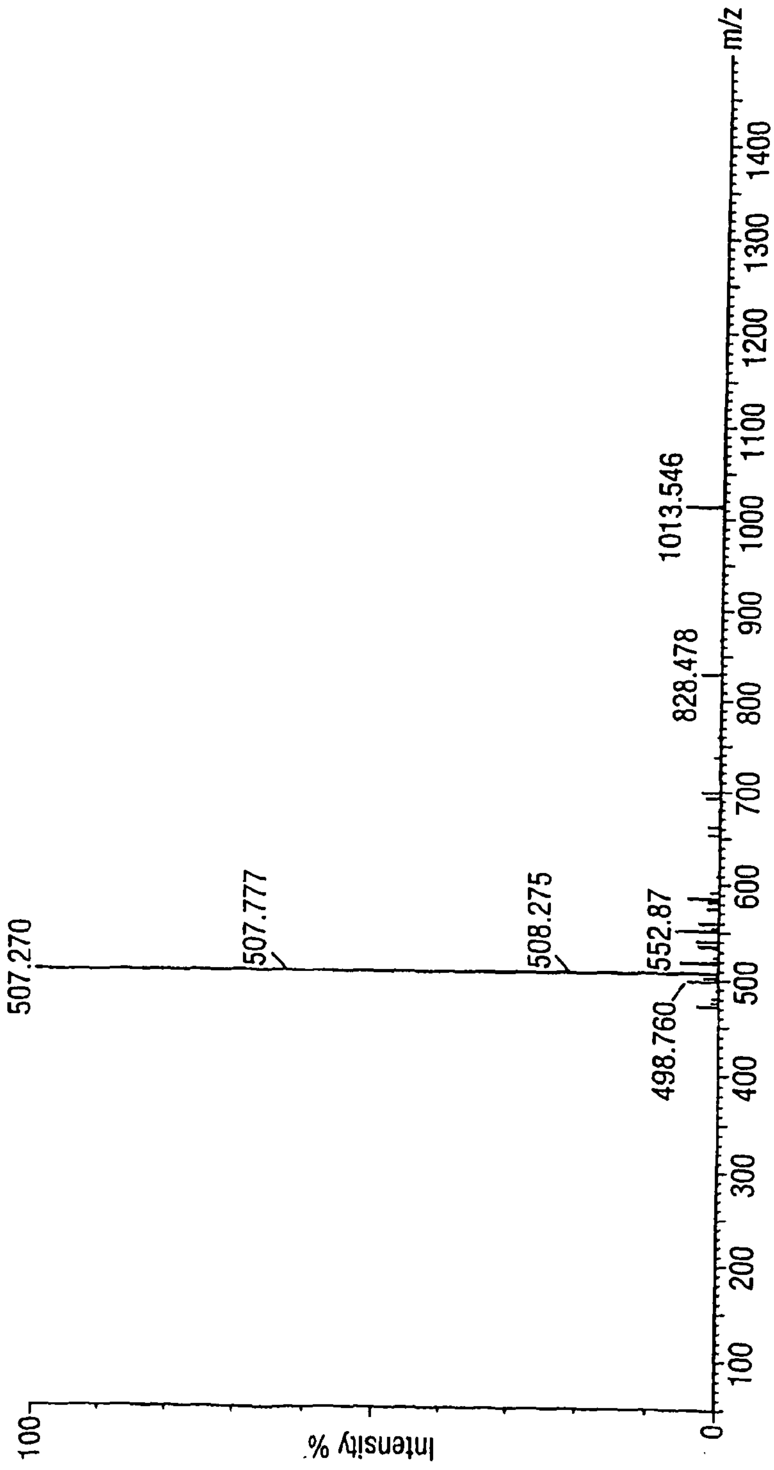
FIG. 7 shows a fragment T5 from ADH sequence ANELLINVK MW 1012.59.
Figure 8:
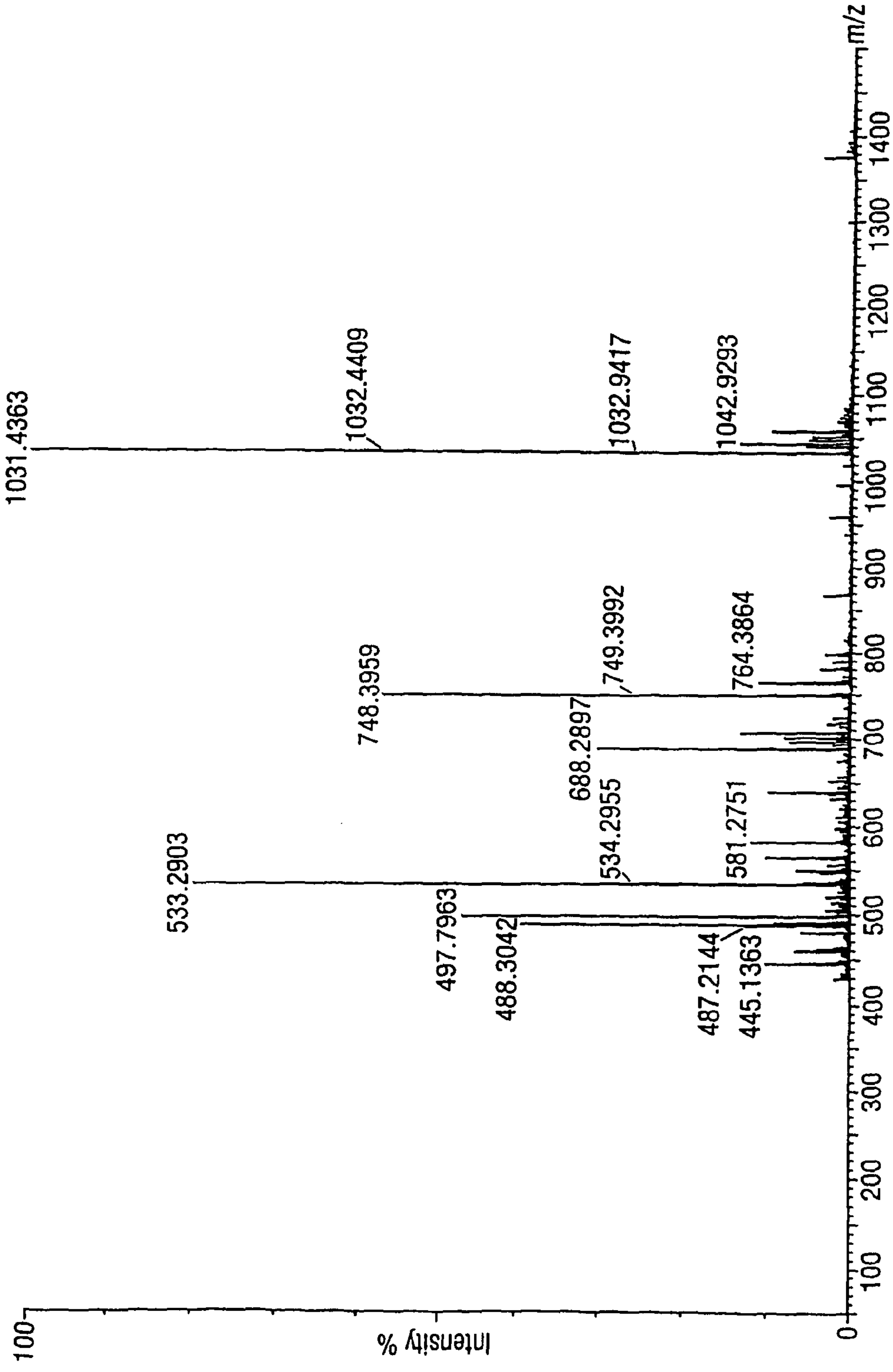
FIG. 8 shows a mass spectrum for a low energy spectra of a tryptic digest of β-Caesin.
Figure 9:
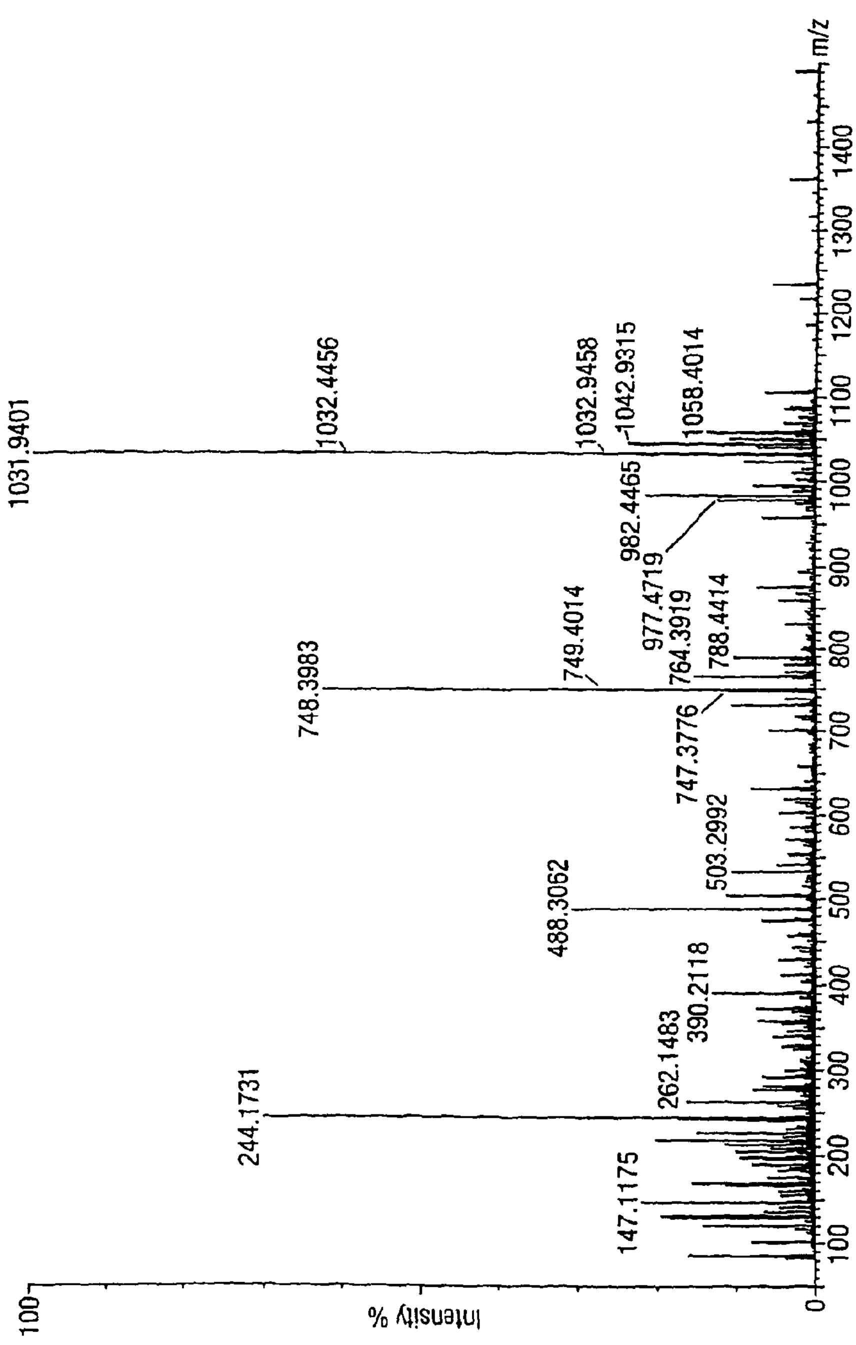
FIG. 9 shows a mass spectrum for a high energy spectra of a tryptic digest of β-Caesin.
Figure 10:
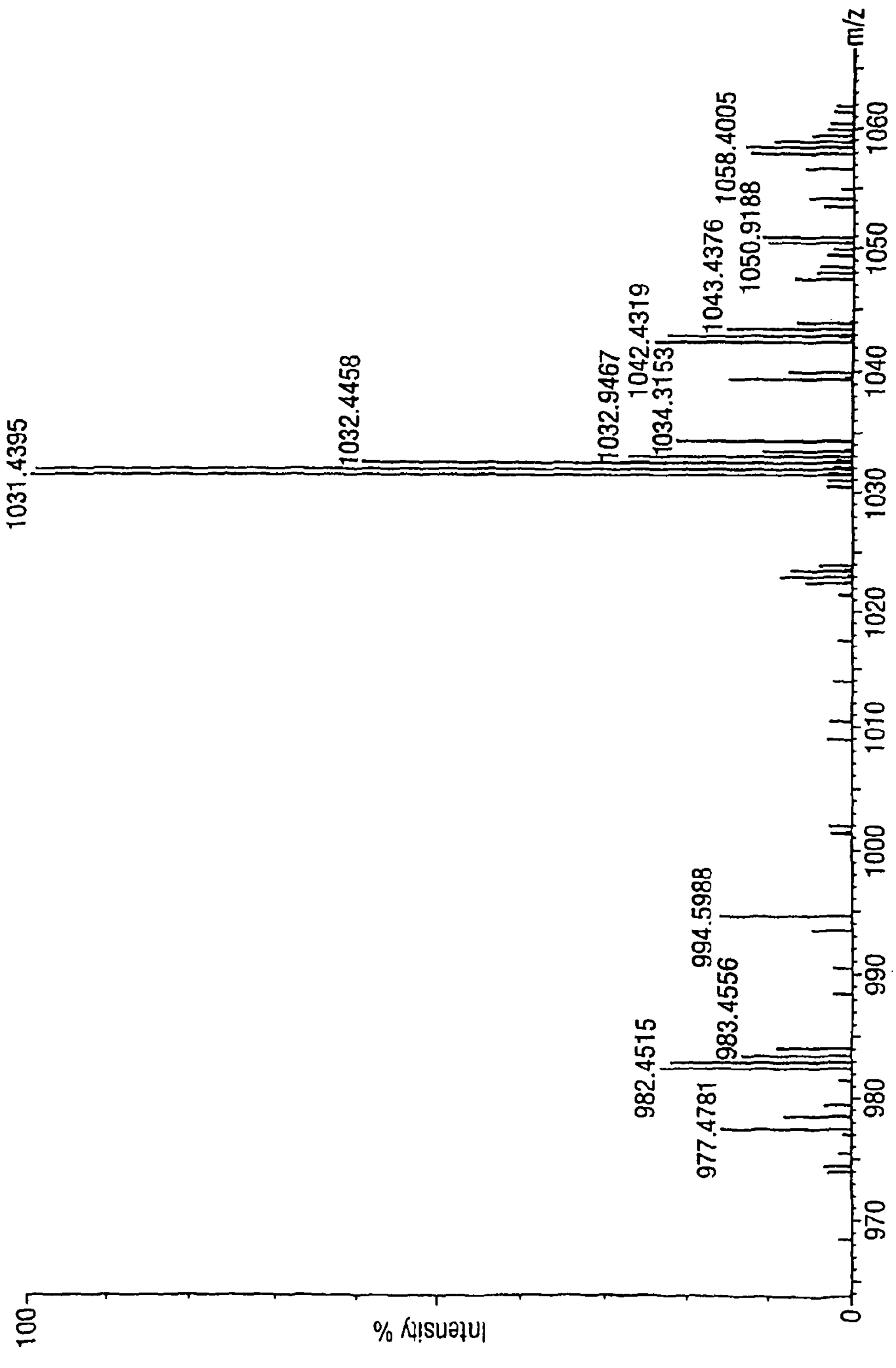
FIG. 10 shows a processed and expanded view of the same spectrum as in FIG. 9.

A preferred embodiment will now be described with reference to FIG. 1. A mass spectrometer 6 is provided which preferably comprises an ion source 1 preferably an Electrospray ionization source. An ion guide 2 is preferably provided downstream of the ion source 1. A quadrupole rod set mass filter 3 is preferably provided downstream of the ion guide 2 and upstream of a collision, fragmentation or reaction device 4. According to an embodiment an orthogonal acceleration Time of Flight mass analyser 5 preferably incorporating a reflectron is preferably provided downstream of the collision, fragmentation or reaction device 4. The ion guide 2 and the mass filter 3 may be omitted if necessary. The mass spectrometer 6 is preferably interfaced with a chromatograph, such as a liquid chromatograph (not shown) so that the sample entering the ion source 1 may be taken from the eluent of the liquid chromatograph.

The quadrupole rod set mass filter 3 is preferably disposed in an evacuated chamber which is preferably maintained at a relatively low pressure e.g. less than $10^{-5}$ mbar. The rod electrodes comprising the mass filter 3 are connected to a power supply which generates both RF and DC potentials which determine the range of mass to charge values that are transmitted by the mass filter 3.

The collision, fragmentation or reaction device 4 preferably comprises either a Collision Induced Dissociation ("CID") fragmentation device, a Surface Induced Dissociation ("SID") fragmentation device, an Electron Transfer Dissociation fragmentation device or an Electron Capture Dissociation fragmentation device.

According to an embodiment the collision, fragmentation or reaction device 4 may comprise an Electron Capture Dissociation fragmentation device. According to this embodiment multiply charged analyte ions are preferably caused to interact with relatively low energy electrons. The electrons preferably have energies of <1 eV or 1-2 eV. The electrons are preferably confined by a relatively strong magnetic field and are directed so that the electrons collide with the analyte ions which are preferably confined within an RF ion guide which is preferably arranged within the collision, fragmentation or reaction device 4. An AC or RF voltage is preferably applied to the electrodes of the RF ion guide so that a radial pseudo-potential well is preferably created which preferably acts to confine ions radially within the ion guide so that the ions can interact with the low energy electrons.

According to another embodiment the collision, fragmentation or reaction device 4 may comprise an Electron Transfer Dissociation fragmentation device. According to this embodiment positively charged analyte ions are preferably caused to interact with negatively charged reagent ions. The negatively charged reagent ions are preferably injected into an RF ion guide or ion trap located within the fragmentation device 4. An AC or RF voltage is preferably applied to the electrodes of the RF ion guide so that a radial pseudo-potential well is preferably created which preferably acts to confine ions radially within the ion guide so that the ions can interact with the negatively charged reagent ions. According to a less preferred embodiment negatively charged analyte ions may alternatively be arranged to interact with positively charged reagent ions.

According to another embodiment the collision, fragmentation or reaction device 4 may comprise a Surface Induced Dissociation fragmentation device. According to this embodiment ions are preferably directed towards a surface or target plate with a relatively low energy. The ions may, for example, be arranged to have an energy of 1-10 eV. The surface or target plate may comprise stainless steel or more preferably the surface or target plate may comprise a metallic plate coated with a monolayer of fluorocarbon or hydrocarbon. The monolayer preferably comprises a self-assembled monolayer. The surface or target plate may be arranged in a plane which is substantially parallel with the direction of travel of ions through the Surface Induced Dissociation fragmentation device in a mode of operation wherein ions are not fragmented. In a mode of operation wherein it is desired to fragment ions, the ions may be deflected onto or towards the surface or target plate so that the ions impinge the surface or target plate at a relatively shallow angle with respect to the surface of target plate. Fragment ions are preferably produced as a result of the analyte ions colliding with the surface or target plate. The fragment ions are preferably directed off or away from the surface or target plate at a relatively shallow angle with respect to the surface or target plate. The fragment ions are then preferably arranged to assume a trajectory which preferably corresponds with the trajectory of ions which are transmitted through or past the Surface Induced Dissociation fragmentation device in a mode of operation wherein ions are not substantially fragmented.

The collision, fragmentation or reaction device 4 may comprise an Electron Collision or Impact Dissociation fragmentation device wherein ions are fragmented upon collisions with relatively energetic electrons e.g. wherein the electrons have >5 eV.

According to other embodiments the collision, fragmentation or reaction device 4 may comprise a Photo Induced Dissociation ("PID") fragmentation device, a Laser Induced Dissociation fragmentation device, an infrared radiation induced dissociation device, an ultraviolet radiation induced dissociation device, a thermal or temperature source fragmentation device, an electric field induced fragmentation device, a magnetic field induced fragmentation device, an enzyme digestion or enzyme degradation fragmentation device, an ion-ion reaction fragmentation device, an ion-molecule reaction fragmentation device, an ion-atom reaction fragmentation device, an ion-metastable ion reaction fragmentation device, an ion-metastable molecule reaction fragmentation device, an ion-metastable atom reaction fragmentation device, an ion-ion reaction device for reacting ions to form adduct or product ions, an ion-molecule reaction device for reacting ions to form adduct or product ions, an ion-atom reaction device for reacting ions to form adduct or product ions, an ion-metastable ion reaction device for reacting ions to form adduct or product ions, an ion-metastable molecule reaction device for reacting ions to form adduct or product ions or an ion-metastable atom reaction device for reacting ions to form adduct or product ions.

According to another embodiment the collision, fragmentation or reaction device may form part of the ion source 1. For example, the collision, fragmentation or reaction device may comprise a nozzle-skimmer interface fragmentation device, an in-source fragmentation device or an ion-source Collision Induced Dissociation fragmentation device.

The collision, fragmentation or reaction device 4 may comprise a quadrupole or hexapole rod set ion guide in order to confine ions. The ion guide may be enclosed in a substantially gas-tight casing (other than a small ion entrance and exit orifice) into which a gas such as helium, argon, nitrogen, air or methane may be introduced at a pressure of between $10^{-4}$ and $10^{-1}$ mbar, preferably $10^{-3}$ mbar to $10^{-2}$ mbar. Suitable RF potentials for the electrodes comprising the collision, fragmentation or reaction device 4 may be provided by a power supply (not shown).

Ions generated by the ion source 1 are preferably transmitted by the ion guide 2 and pass via an interchamber orifice 7 into a vacuum chamber 8 housing the mass filter 3 and the collision, fragmentation or reaction device 4. The ion guide 2 is preferably maintained at a pressure intermediate to that of the ion source 1 and the vacuum chamber 8. In the embodiment shown, ions may be mass filtered by the mass filter 3 before entering the collision, fragmentation or reaction device 4. However, mass filtering is not essential to the present invention. In a mode of operation ions are preferably fragmented or reacted within the collision, fragmentation or reaction device 4 so that a plurality of fragment, product, daughter or adduct ions are preferably produced. Fragment, product, daughter or adduct ions exiting the collision, fragmentation or reaction device 4 preferably pass into the Time of Flight mass analyser 5 arranged downstream of the collision, fragmentation or reaction device 4. Other ion optical components, such as further ion guides and/or electrostatic lenses, may be present (which are not shown in the figures or described herein) in order to maximise ion transmission between various parts or stages of the mass spectrometer. Various vacuum pumps (not shown) may be provided for maintaining optimal vacuum conditions in the mass spectrometer. The Time of Flight mass analyser 5 incorporating a reflectron preferably operates in a known way by measuring the transit time or time of flight of ions. Ions are preferably injected as a packet of ions into the drift or time of flight region of the mass analyzer 5. The ions become temporally separated and their mass to charge ratios can be determined by measuring the transit time or time of flight of ions through the drift or time of flight region.

A control system (not shown) preferably provides control signals for the various power supplies (not shown) which respectively provide the necessary operating potentials for the ion source 1, ion guide 2, quadrupole mass filter 3, collision, fragmentation or reaction device 4 and the Time of Flight mass analyser 5. These control signals preferably determine the operating parameters of the instrument, for example the mass to charge ratios transmitted through the mass filter 3 and the operation of the mass analyser 5. The control system is preferably controlled by signals from a computer (not shown) which may also be used to process the mass spectral data acquired. The computer may also display and store mass spectra produced from the analyser 5 and receive and process commands from an operator. The control system may be set to perform various methods automatically and make various determinations without operator intervention, or may optionally require operator input at various stages.

The control system is preferably arranged to switch, vary or alter the collision, fragmentation or reaction device 4 back and forth between at least two different modes. If the collision, fragmentation or reaction device 4 comprises an Electron Capture Dissociation fragmentation device then the electron source or beam may be switched ON in a fragmentation mode of operation and may be switched OFF in a non-fragmentation mode of operation (or may be left ON or switched OFF in a non-fragmentation mode in which ions are directed to bypass the device, so the ions are not fragmented.) If the collision, fragmentation or reaction device 4 comprises an Electron Transfer Dissociation fragmentation device 4 then reagent ions may be injected into an ion guide or ion trap comprising analyte ions in a fragmentation mode of opertion and substantially no reagent ions may be injected into the ion guide or ion trap in a non-fragmentation mode of operation. If the collision, fragmentation or reaction device 4 comprises a Surface Induced Dissociation fragmentation device then the analyte ions may be directed so that they collide or impinge upon the surface or target plate in a fragmentation mode of operation and the analyte ions may be directed straight past the surface or target plate in a non-fragmentation mode of operation so that the analyte ions do not collide or impinge upon the surface of target plate.

The control system preferably switches the collision, fragmentation or reaction device 4 between modes according to an embodiment approximately once every second. When the mass spectrometer is used in conjunction with an ion source being provided with an eluent separated from a mixture by means of liquid or gas chromatography, the mass spectrometer 6 may be run for several tens of minutes over which period of time several hundred high fragmentation or reaction mass spectra and several hundred low fragmentation or reaction mass spectra may be obtained.

At the end of the experimental run the data which has been obtained is preferably analysed. According to an arrangement parent or precursor ions and fragment, product, daughter or adduct ions may be recognised on the basis of the relative intensity of a peak in a mass spectrum obtained when the collision, fragmentation or reaction device 4 was in one mode compared with the intensity of the same peak in a mass spectrum obtained approximately a second later in time when the collision, fragmentation or reaction device 4 was in another mode.

Mass chromatograms for each parent and fragment, product, daughter or adduct ion may be generated and fragment, product, daughter or adduct ions may be assigned to parent or precursor ions on the basis of their relative elution times.

Since all the data is acquired and subsequently processed then all fragment, product, daughter or adduct ions may be associated with a parent or precursor ion by closeness of fit of their respective elution times. This allows all the parent or precursor ions to be identified from their fragment, product, daughter or adduct ions irrespective of whether or not they have been discovered by the presence of a characteristic fragment, product, daughter or adduct ion or characteristic "neutral loss".

An attempt may be made to reduce the number of parent or precursor ions of interest. A list of possible (i.e. not yet finalised) candidate parent or precursor ions may be formed by looking for parent or precursor ions which may have given rise to a predetermined fragment, product, daughter or adduct ion of interest e.g. an immonium ion from a peptide. Alternatively, a search may be made for parent and fragment, product, daughter or adduct ions wherein the parent or precursor ion could have fragmented into a first component comprising a predetermined ion or neutral particle and a second component comprising a fragment, product, daughter or adduct ion. Various steps may then be taken to further reduce/refine the list of possible candidate parent or precursor ions to leave a number of final candidate parent or precursor ions which are then subsequently identified by comparing elution times of the parent and fragment, product, daughter or adduct ions. As will be appreciated, two ions could have similar mass to charge ratios but different chemical structures and hence would most likely fragment differently enabling a parent or precursor ion to be identified on the basis of a fragment, product, daughter or adduct ion.

As noted above, some embodiments provide substantial non-fragmentation during alternate, interleaved, periods by switching the operation of a fragmentation device and/or by bypassing a fragmentation device. Alternating fragmentation or reaction of a sample is accomplished in any suitable manner. For example, sample molecules and/or ions may optionally be admitted to a device within which a sample stream is alternately fragmented and not fragmented. Alternatively, a sample stream may be admitted to and bypass a device, to again provide fragmented or reacted material from the device and not fragmented material that bypasses the device. Thus, "pseudo-chromatograms" are obtainable for product ions and such chromatograms will be well, if not perfectly, aligned in time with the chromatograms for precursor ions, since the mass spectra for precursor and product ions are collected essentially simultaneously due to the interleaved periods of fragmentation and non-fragmentation of the sample stream.

As described next, some embodiments entail bypassing of a fragmentation device. Thus, for example, a sample having a temporal variation may optionally be analysed by alternately passing sample material to a fragmentation device and bypassing the device to alternately fragment and not fragment.

In the following, for convenience, a "fragmentation device" refers generally to any suitable fragmentation device, reaction device, collision device, or a device suitable for converting precursor ions into product ions or some other form for a desired analysis.

A method for analyzing a sample comprising a mixture of components is disclosed comprising: forming precursor ions from the components of a sample; alternately causing precursor ions to pass to and to bypass a fragmentation device, to form product ions from at least some of the precursor ions that pass to the device, and to form substantially fewer product ions from precursor ions that bypass the device; and alternately obtaining mass spectra from product ions received from the fragmentation device, and from precursor ions that bypassed the fragmentation device.

Causing precursor ions to pass to and to bypass the fragmentation device optionally comprises alternating for a few minutes to several tens of minutes to an hour or more. The collection of data, in this manner, optionally is determined by the amount of time required to deliver one sample to a mass spectrometer, for example, from a chromatographic module.

During the analysis of one sample, any where from tens to hundreds to thousands of mass spectra may be collected. The duration, or period, of each alternation between fragmentation and non-fragmentation is optionally a fraction of a second to about one second to about several seconds. One duration preferably includes at least one mass spectrum, preferably more, such as about 10 spectra. Preferably, the alternation cycle is sufficiently fine to resolve temporal changes of interest in the sample. For example, where the sample is delivered from a chromatograph, alternating in a time span approximately equals one tenth of a chromatographic peak width.

Particularly preferred embodiments of the present invention will now be described with reference to FIGS. 11-13. These embodiments preferably relate to MRM-type analyses performed using a Time of Flight mass analyser.

According to the preferred embodiment the above described apparatus and methods can be extended to support Single Reaction Monitoring (SRM) and Multiple Reaction Monitoring (MRM) type analyses on a Time of Flight mass analyser rather than as conventionally performed on a triple-quadrupole instrument.

As is well known in the art of mass spectrometry, SRM and MRM studies are commonly used in mass spectrometric quantitation and/or monitoring of preselected or known compounds through use of apparatus that includes at least two quadrupoles operated as mass filters/analysers. The first quadrupole is used to select precursor or parent ions hiving a mass to charge ratio associated with the compound of interest. These precursor or parent ions are then fragmented, and the second quadruple is used to select product or fragment ions having a particular mass to charge which have been fragmented from the filtered precursor or parent ions. The dual selection/filtering process provides confident observation of the compound of interest.

In a typical SRM analysis, as performed on a tandem quadrupole instrument such as a triple quadrupole instrument, the presence of a specific compound of interest is monitored over time. SRM plots of relative intensity versus time are usually relatively simple and usually contain only a single peak. This characteristic makes a typical SRM plot useful for sensitive and specific quantitation.

A SRM experiment may be accomplished by specifying the precursor or parent mass or mass to charge ratio of the compound for MS/MS fragmentation and then monitoring for a specific single fragment ion. The specific experiment is typically known as a "transition" and may be represented in the form parent mass→fragment mass (e.g. 534→375).

It is therefore possible to quantitatively observe the presence of a specific known component of interest in a sample stream. This conventional approach is limited, however, by the requirement to select a compound of interest prior to an analysis and then collect data only for that compound. Accordingly, potentially useful data may be wasted.

According to embodiments of the present invention the limitations of conventional SRM/MRM and similar analyses may be mitigated by time alignment and full data sets as described above.

Embodiments of the present invention preferably provide various advantages in comparison to prior tandem quadrupole based approaches. In particular, according to the preferred embodiment several compounds of interest can be monitored simultaneously, since no selection of a single precursor ion from a sample stream is required during analysis. Furthermore, more than one product or fragment ion can be monitored in association with a precursor or parent ion of interest because no selection of a single product or fragment ion is required during analysis (i.e. data is obtained substantially for all precursor or parent ions and for all product or fragment ions.)

Figure 11A:
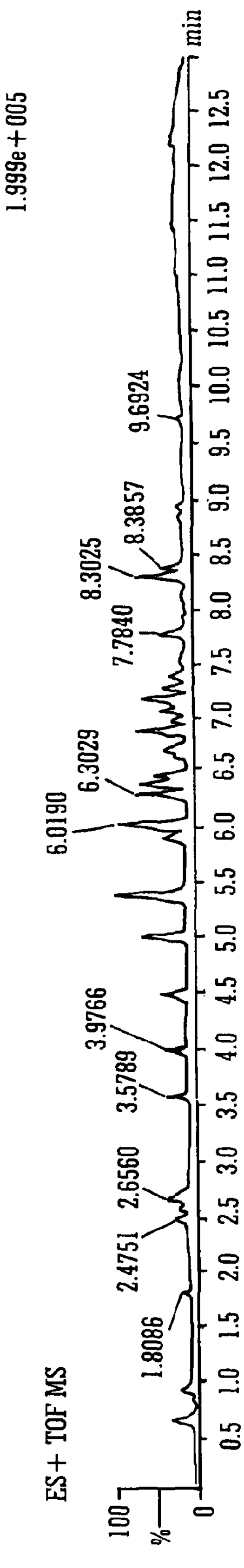
FIG. 11A shows a full ion chromatogram of a sample.
Figure 11C:
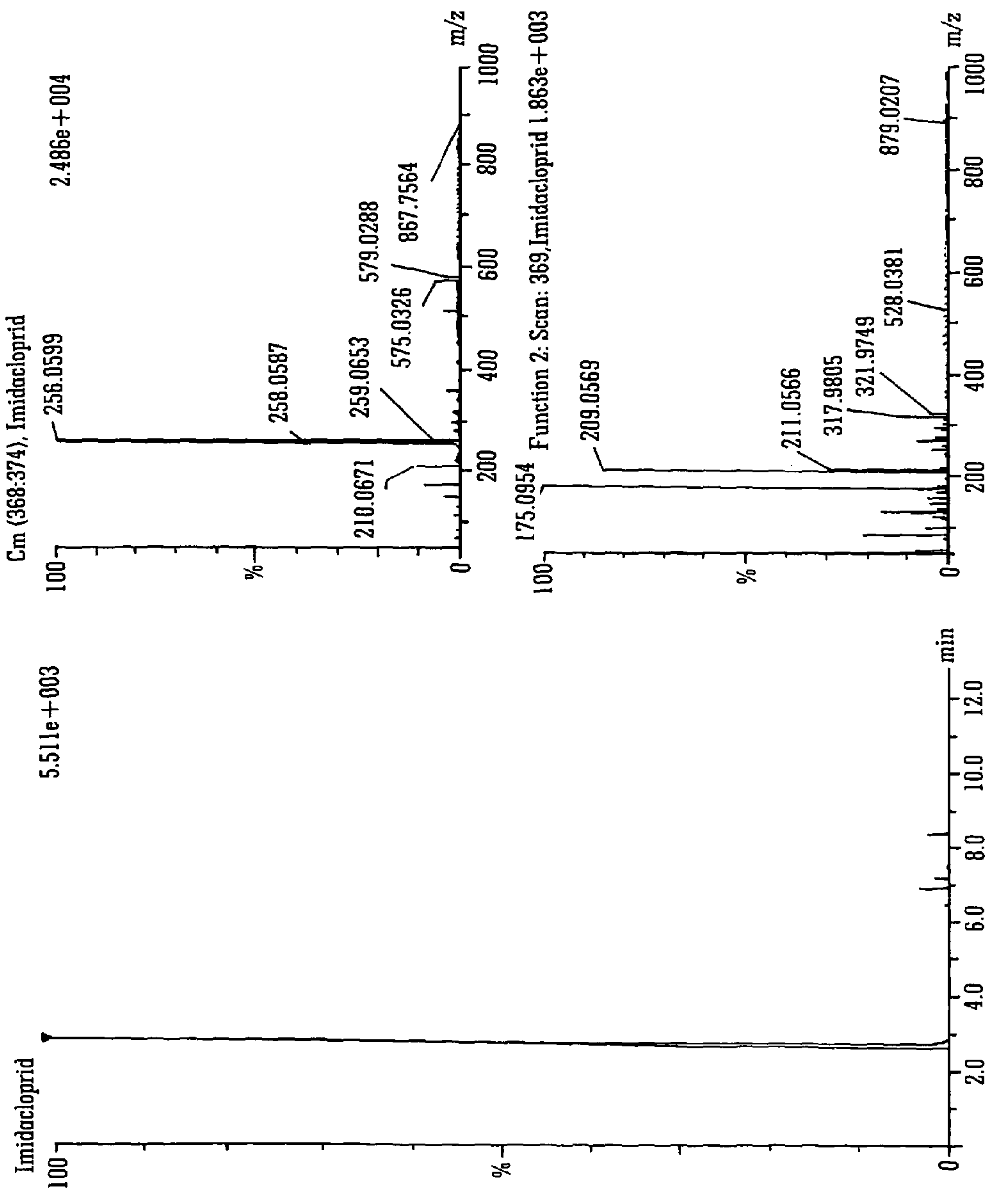
FIG. 11B shows a list of compounds of potential interest which may be screened for, and FIG. 11C shows an extracted parent ion chromatogram (LHS), a parent ion mass spectrum (upper RHS) and a corresponding fragment ion mass spectrum (lower RHS)
Figure 12A:
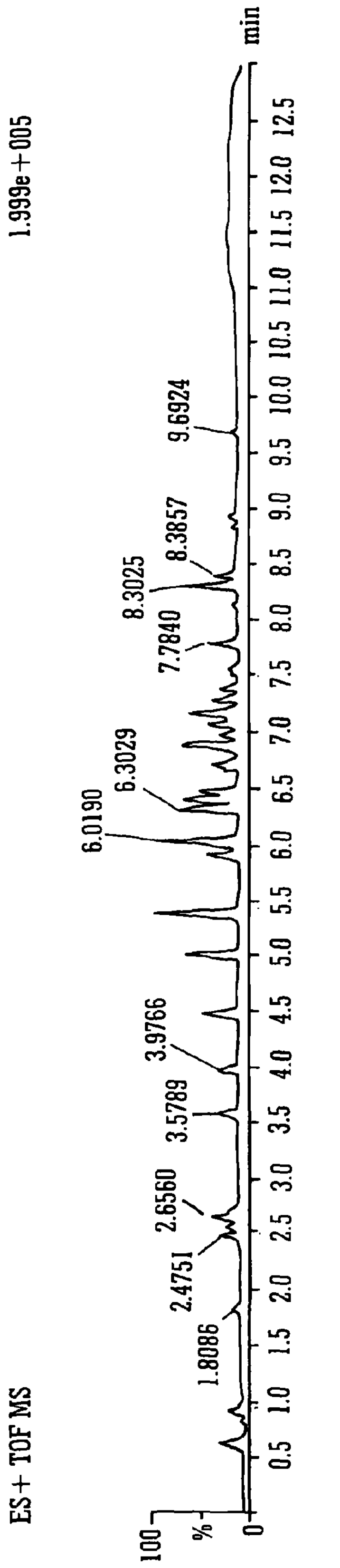
FIG. 12A shows a full ion chromatogram of a sample.
Figure 12C:
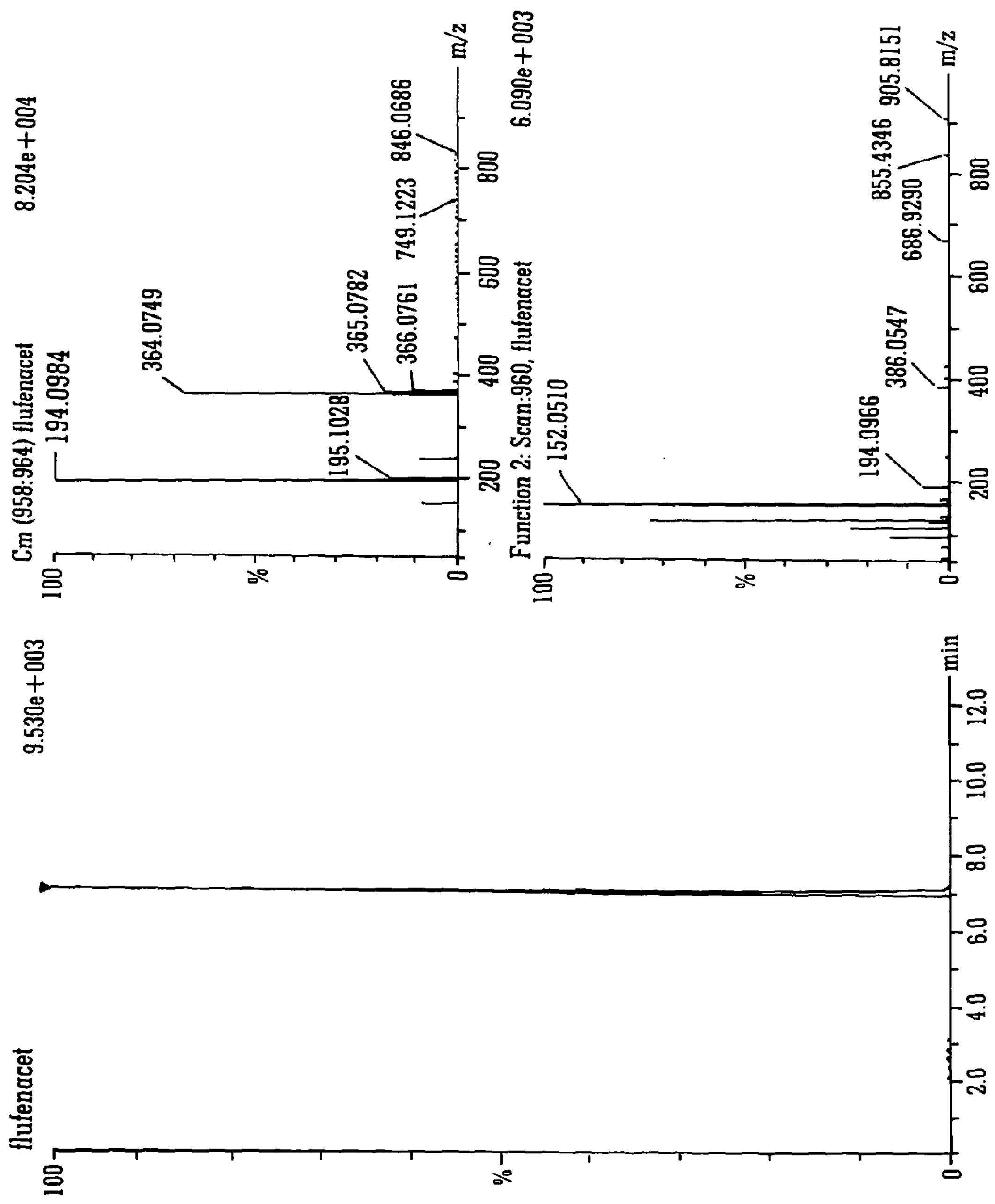
FIG. 12B shows a list of compounds of potential interest which may be screened for, and FIG. 12C shows an extracted parent ion chromatogram (LHS), a parent ion mass spectrum (upper RHS) and a corresponding fragment ion mass spectrum (lower RHS)
Figure 13A:
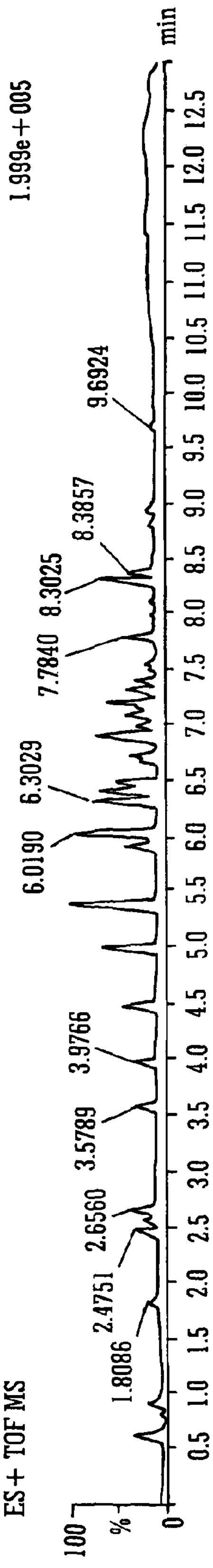
FIG. 13A shows a full ion chromatogram of a sample.

FIGS. 11-13 are screenshots of displays of example analyses of two compounds of interest present in a single sample where all data was collected during the analysis of one temporally (chromatographically) varying sample. An Electrospray ion source was used for precursor ion production and the data was collected for a sample run that lasted for approximately 13 minutes, as illustrated by the full chromatograms shown in FIGS. 11A, 12A and 13A.

Figure 13C:
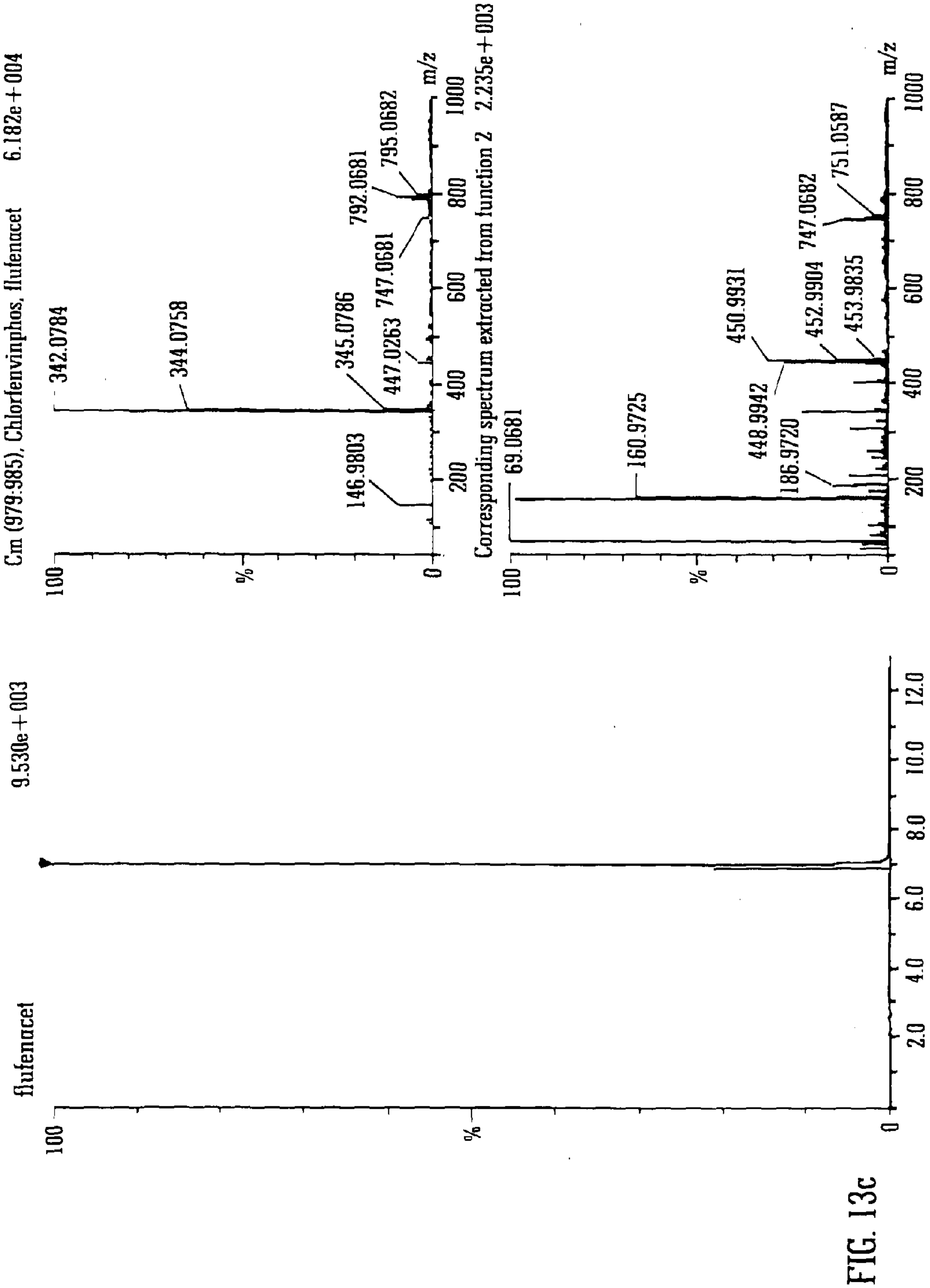
FIG. 13B shows a list of compounds of potential interest which may be screened for, and FIG. 13C shows an extracted parent ion chromatogram (LHS), a parent ion mass spectrum (upper RHS) and a corresponding fragment ion mass spectrum (lower RHS).

FIGS. 11B, 12B and 13B list all compounds of potential interest which may be screened for. The left hand figure of FIGS. 11C, 12C and 13C is an extracted parent ion chromatogram for a precursor or parent ion associated with a selected compound of interest. The two right-hand figures of FIGS. 11C, 12C and 13C are two mass spectra. The upper mass spectrum corresponds with a precursor ion associated with a particular compound and the lower mass spectrum corresponds with a product ion associated with the precursor ion. Accordingly, the upper mass spectrum comprises a "low-fragmentation" mass spectrum and the lower mass spectrum comprises a "high-fragmentation" mass spectrum collected at a time very close to the time when the upper mass spectrum was obtained.

The analysis system preferably includes a database of precursor or parent ions and their expected mass to charge ratio values and one or more (preferably four) product or fragment ions preferably associated with each precursor ion and the expected mass to charge ratio values of the product or fragment ions.

Extracted parent ion chromatograms are preferably produced by extracting intensity data for a particular selected precursor or parent ion whose association with a compound of interest has been confirmed through time alignment confirmation with one or more product ions associated with the selected precursor. The intensity as a function of time of the confirmed precursor or parent ion is obtained from the series of mass spectra that were collected as the sample was analysed over time. The extracted data may then be depicted as a graph of intensity or relative intensity versus time as shown in the extracted parent ion chromatograms shown in FIGS. 11C, 12C and 13C.

Extracted ion chromatograms for precursor ions and/or product ions may be produced. Also, a summed chromatogram may be produced if more than one precursor-type is available and utilized, or if multiple isotopes are obtained for a particular precursor.

As illustrated in FIG. 11B, after data collection from a sample a determination was made to monitor and quantify the presence of Imidacloprid® in the sample stream. Imidaclopriad® is a moderately toxic insecticide manufactured by Bayer Cropscience (Bayer AG®.

Parent or precursor ions having an expected mass to charge ratio of 256.0601 and product or fragment ions having an expected transition mass to charge ratio of 209.0594 were selected for display. In this example, based on empirical data, the known compound was expected to have a chromatographic elution time (i.e. retention time) of 2.72 minutes. Correct association between the precursor or parent ions and observed product or fragment ion(s) was confirmed by time-aligned association. That is, both precursor or parent and product or fragment ions were confirmed as having expected mass to charge ratio values within an error tolerance and also having substantially the same retention time (within an error tolerance.)

Availability of an expected retention time is not essential but advantageously permits windowing or filtering of the data. Optionally, without any knowledge of expected retention time(s), all data may be surveyed for precursor or parent ions having an expected mass to charge ratio for a selected compound of interest. The association of potential precursor or parent ions with the compound may then be confirmed by confirming that one or more product or fragment ions are also present in association with the same retention time.

FIGS. 12A-C and 13A-C illustrate an analysis wherein flufenacet® which is an herbicide available from Bayer Corporation® was selected after data collection for monitoring in the sample data. Precursor or parent ions having an expected mass to charge ratio of 364.0743 and product or fragment ions having an expected transition mass to charge ratio of 194.0981 were expected in association with flufenacet®. As indicated in the list, based on empirical data, the compound was expected to have a chromatographic elution time (i.e. retention time) of 7.02 minutes.

Upon examining the data for candidate precursor or parent ions, two candidate precursor or parent ions having potentially correct mass to charge ratio values appeared. These two candidate precursor or parent ions appear in the list labeled as scan 961 and scan 982. The two candidate precursor or parent ions had intensity maxima associated with different scan times, each scan time corresponding to a particular retention time. Confirmation of the correct candidate precursor or parent ions as being the correct precursor or parent of flufenacet® was then obtained by confirming which of the candidate parent ions was time-aligned i.e. shared a retention time association with one or more of the expected product ions.

As illustrated in FIGS. 12B and 12C, the 961 scan was confirmed to contain the correct precursor or parent ion for flufenacet® because, as depicted in the upper parent ion mass spectrum and the lower fragment ion mass spectrum of FIG. 12C, the parent ion scans at and near 961 contained the expected precursor or parent ion and the fragment ion scan at 960 contained the expected product ions. The extracted parent ion chromatogram was generated by seeking and confirming precursor or parent ions at all times to then graph the intensity of the precursor ion as a function of chromatographic elution time.

FIGS. 13A-13C depicts precursor or parent ion and product or fragment ion mass spectra for the second candidate parent ion. As can be seen from the lower product or fragment ion mass spectrum (corresponding to or near to scan 982) as shown in FIG. 13C, the expected product or fragment ion having a mass to charge ratio of 194.0981 is absent. Therefore, the second candidate precursor or parent ion is deemed not to be associated with the compound of interest i.e. flufenacet®.

The correct association between an observed candidate precursor or parent ion and a compound of interest is then confirmed by confirmation of time-alignment between the candidate precursor or parent ion and observed product or fragment ion(s) having expected mass to charge ratio values. With regard to the two candidate parent ions being detected and indicated in the list, the association of one with flufenacet® was confirmed as indicated in the list with a superscript "e" in FIG. 13B.

Referring to a precursor or parent ion as mass M1 which is fragmented to produce a product or fragment ion mass M2, embodiments of the invention preferably provide an intensity versus time plot of ion M2 (or M1 or both M1 and M2) for quantitative experiments.

For example, the acquired data (or peak list) may be processed in a chronological manner and then the intensity of M2 may be recorded in a new function only if certain conditions are met. The conditions can, for example, indicate that both mass M2 and mass M1 must be present in the high and low energy acquisitions respectively, and furthermore that their retention times must also agree to within normal or user defined limits. As a further optional condition, their masses or mass to charge ratios may be required to be within a specific tolerance and optionally their isotope clusters, ion mobility and chromatographic peak shapes may also be required to meet user defined criteria. Furthermore, the ratio of the intensity of the parent ion to the intensity of onr or more corresponding fragment ions may be required to fall within a predetermined range in order for a positive confirmation to be made that a known compound is present in the sample. Optionally, thresholds for M1 and M2 may also be used to avoid selection of noise.

If M2 and M1 meet these conditions then the resultant output is the intensity of M2. However, if M1 and M2 do not met the conditions then the resultant output is preferably zero.

The preferred embodiment may, therefore, be considered as involving the conditional logical operation AND of high-fragmentation and low-fragmentation data. The output of the process may be considered as being the product of this logical AND operation and the intensity of M2.

Further embodiments are contemplated wherein, for example, an entire M2 (fragment ion) isotopic cluster may be utilized. For example, multiple isotopes or other related fragment ions (M2, M3, M4 . . . ) in the high energy function may be summed and may be used in place of the intensity of M2.

The output data according to preferred embodiment preferably emulates MRM but differs from conventional tandem quadrupole MRM in that no parent ion isolation is preferably either performed or required. In order to improve specificity/selectivity, exact mass and/or conditional isotope ratios may be used.

The output data may be used for quantification and/or for exact mass screening. According to an embodiment one exact mass (e.g. M1) at high resolution and a related mass (M2) may be used to improve the accuracy in comparison to prior approaches.

Although the present invention has been described with reference to preferred embodiments, it will be understood by those skilled in the art that various changes in form and detail may be made without departing from the scope of the invention as set forth in the accompanying claims.

The invention claimed is:

1. A method of screening a sample for a presence of one or more known compounds of interest comprising:

providing a mass spectrometer comprising a fragmentation device and a mass analyser;

repeatedly switching said fragmentation device between a first mode of operation and a second mode of operation, wherein in said first mode of operation parent ions are not substantially fragmented within said fragmentation device or are arranged to bypass said fragmentation device and are then subsequently mass analysed by said mass analyser and wherein in said second mode of operation parent ions are substantially fragmented within said fragmentation device to form a plurality of fragment ions which are then subsequently mass analysed by said mass analyser;

determining if a candidate parent ion of interest is present in a first data set obtained when said fragmentation device was operated in said first mode of operation; and determining if one or more corresponding fragment ions of interest are present in a second data set obtained immediately before or after said first data set;

wherein if said candidate parent ion of interest is determined to be present in said first data set and one or more corresponding fragment ions of interest are also determined to be present in said second data set then said method further comprises determining whether or not said candidate parent ion of interest and said one or more fragment ions of interest have substantially similar elution or retention times or ion mobility drift times;

wherein if said candidate parent ion of interest and said one or more fragment ions of interest are determined to have substantially similar elution or retention times or ion mobility drift times then a determination is made that a known compound of interest is present in said sample.

2. A method of screening a sample for a presence of one or more known compounds of interest comprising:

providing a mass spectrometer comprising a fragmentation device and a mass analyser;

repeatedly switching said fragmentation device between a first mode of operation and a second mode of operation, wherein in said first mode of operation parent ions are not substantially fragmented within said fragmentation device or are arranged to bypass said fragmentation device and are then subsequently mass analysed by said mass analyser and wherein in said second mode of operation parent ions are substantially fragmented within said fragmentation device to form a plurality of fragment ions which are then subsequently mass analysed by said mass analyser;

determining if one or more fragment ions of interest are present in a second data set obtained when second fragmentation device was operated in said second mode of operation; and determining if a corresponding candidate parent ion of interest is present in a first data set obtained when said fragmentation device was operated in said first mode of operation immediately before or after said second data set;

wherein if said one or more fragment ions of interest are determined to be present in said second data set and said corresponding candidate parent ion of interest is also determined to be present in said first data set and then said method further comprises determining whether or not said candidate parent ion of interest and said one or more fragment ions of interest have substantially similar elution or retention times or ion mobility drift times;

wherein if said candidate parent ion of interest and said one or more fragment ions of interest are determined to have substantially similar elution or retention times or ion mobility drift times then a determination is made that a known compound of interest is present in said sample.

3. A method as claimed in claim 1, wherein said mass analyser comprises a Time of Flight mass analyser, a Fourier Transform Ion Cyclotron Resonance mass analyser or an electrostatic orbital mass analyser.

4. A method as claimed in claim 1, wherein said elution or retention time comprises an elution or retention time from a chromatographic column.

5. A method as claimed in claim 1, wherein said ion mobility drift times correspond with ion mobility drift times of ions through an ion mobility spectrometer or separator arranged upstream of said fragmentation device.

6. A method as claimed in claim 1, wherein said fragmentation device comprises a Collision Induced Dissociation fragmentation device, an Electron Transfer Dissociation fragmentation device, an Electron Capture Dissociation fragmentation device or a Surface Induced Dissociation fragmentation device.

7. A method as claimed in claim 1, wherein if said candidate parent ion of interest and said one or more fragment ions of interest are determined to have substantially different elution or retention times or ion mobility drift times then said candidate parent ion of interest is rejected, downgraded in status or reduced in significance as a candidate parent ion of interest.

8. A method as claimed in claim 1, wherein if said candidate parent ion of interest is determined to have a lower charge state that one or more of said corresponding fragment ions of interest then said candidate parent ion of interest is rejected, downgraded in status or reduced in significance as a candidate parent ion of interest.

9. A method as claimed in claim 1, wherein if said candidate parent ion of interest is determined to have an unexpected isotopic distribution then said candidate parent ion of interest is rejected, downgraded in status or reduced in significance as a candidate parent ion of interest.

10. A method as claimed in claim 1, wherein if fragment ions of interest corresponding with said candidate parent ion of interest are determined to have an unexpected isotopic distribution then said candidate parent ion of interest is rejected, downgraded in status or reduced in significance as a candidate parent ion of interest.

11. A method as claimed in claim 1, wherein if said candidate parent ion of interest or corresponding fragment ions of interest are determined to have an elution or retention time falling outside of an expected time window then said candidate parent ion of interest is rejected, downgraded in status or reduced in significance as a candidate parent ion of interest.

12. A method as claimed in claim 1, wherein if said candidate parent ion of interest or corresponding fragment ions of interest are determined to have an ion mobility drift time falling outside of an expected time window then said candidate parent ion of interest is rejected, downgraded in status or reduced in significance as a candidate parent ion of interest.

13. A method as claimed in claim 1, wherein if a ratio of an intensity of said candidate parent ion of interest to one or more of said fragment ions of interest falls outside an expected range then said candidate parent ion of interest is rejected, downgraded in status or reduced in significance as a candidate parent ion of interest.

14. A method as claimed in claim 2, further comprising determining an intensity of or quantifying said known compound of interest.

15. A method as claimed in claim 1, wherein if a ratio of an intensity of said candidate parent ion of interest to one or more of said fragment ions of interest falls within an expected range then a determination is made that a known compound of interest is present in said sample.

16. A method as claimed in claim 1, further comprising determining an intensity of or quantifying said known compound of interest.

17. A method as claimed in claim 1, further comprising determining the intensity of or quantifying said known compound of interest either: (i) by summing an intensity of an isotopic distribution of said parent ion of interest; or (ii) by summing an intensity of all fragment ions which are determined as corresponding with said parent ion of interest.

18. A mass spectrometer comprising:

a fragmentation device;

a mass analyser; and a control system arranged and adapted:

(i) to switch repeatedly said fragmentation device between a first mode of operation and a second mode of operation, wherein in said first mode of operation parent ions are not substantially fragmented within said fragmentation device or are arranged to bypass said fragmentation device and are then subsequently mass analysed by said mass analyser and wherein in said second mode of operation parent ions are substantially fragmented within said fragmentation device to form a plurality of fragment ions which are then subsequently mass analysed by said mass analyser;

(ii) to determine if a candidate parent ion of interest is present in a first data set obtained when said fragmentation device was operated in said first mode of operation; and (iii) to determine if one or more corresponding fragment ions of interest are present in a second data set obtained immediately before or after said first data set;

(iv) wherein if said candidate parent ion of interest is determined to be present in said first data set and one or more corresponding fragment ions of interest are also determined to be present in said second data set then said control system further determines whether or not said candidate parent ion of interest and said one or more fragment ions of interest have substantially similar elution or retention times or ion mobility drift times;

(v) wherein if said candidate parent ion of interest and said one or more fragment ions of interest are determined to have substantially similar elution or retention times or ion mobility drift times then said control system determines that a known compound of interest is present in said sample.

19. A mass spectrometer comprising:

a fragmentation device;

a mass analyser; and a control system arranged and adapted:

(i) to switch repeatedly said fragmentation device between a first mode of operation and a second mode of operation, wherein in said first mode of operation parent ions are not substantially fragmented within said fragmentation device or are arranged to bypass said fragmentation device and are then subsequently mass analysed by said mass analyser and wherein in said second mode of operation parent ions are substantially fragmented within said fragmentation device to form a plurality of fragment ions which are then subsequently mass analysed by said mass analyser; and (ii) to determine if one or more fragment ions of interest are present in a second data set obtained when second fragmentation device was operated in said second mode of operation;

(iii) to determine if a corresponding candidate parent ion of interest is present in a first data set obtained when said fragmentation device was operated in said first mode of operation immediately before or after said second data set;

(iv) wherein if said one or more fragment ions of interest are determined to be present in said second data set and said corresponding candidate parent ion of interest is also determined to be present in said first data set and then said control system further determines whether or not said candidate parent ion of interest and said one or more fragment ions of interest have substantially similar elution or retention times or ion mobility drift times;

(v) wherein if said candidate parent ion of interest and said one or more fragment ions of interest are determined to have substantially similar elution or retention times or ion mobility drift times then said control system determines that a known compound of interest is present in said sample.

20. A method of mass spectrometry comprising:

mass analysing a sample and acquiring a parent ion data set and a fragment ion data set; and determining if a parent ion of interest is present in said parent ion data set and a corresponding fragment ion is present in said fragment ion data set;

wherein if said parent ion of interest and a corresponding fragment ion are present in said data sets then said method further comprises confirming whether or not said parent ion of interest and said corresponding fragment ion have: (i) substantially a same elution time; (ii) substantially a same ion mobility drift time; or (iii) substantially a same elution time and substantially a same ion mobility drift time;

wherein if said candidate parent ion of interest and said corresponding fragment ion are determined to have substantially similar elution or retention times or ion mobility drift times then a determination is made that a known compound of interest is present in said sample.

21. A mass spectrometer comprising:

a fragmentation device;

a mass analyser; and a control system arranged and adapted:

(i) to mass analyse a sample and acquire a parent ion data set and a fragment ion data set; and (ii) to determine if a parent ion of interest is present in said parent ion data set and a corresponding fragment ion is present in said fragment ion data set;

wherein if said control system determines that said parent ion of interest and a corresponding fragment ion are present in said data sets then said control system further confirms whether or not said parent ion of interest and said corresponding fragment ion have: (i) substantially a same elution time; (ii) substantially a same ion mobility drift time; or (iii) substantially a same elution time and substantially a same ion mobility drift time;

wherein if said candidate parent ion of interest and said corresponding fragment ion are determined to have substantially similar elution or retention times or ion mobility drift times then said control system determines that a known compound of interest is present in said sample.

22. A method of screening a sample for a presence of one or more known compounds of interest comprising:

providing a mass spectrometer comprising a fragmentation device and a mass analyser;

repeatedly obtaining parent ion and fragment ion mass spectral data;

determining if a candidate parent ion of interest is present in said parent ion mass spectral data; and determining if one or more corresponding fragment ions of interest are present in said fragment ion mass spectral data;

wherein if said candidate parent ion of interest is determined to be present in said parent ion mass spectral data and one or more corresponding fragment ions of interest are also determined to be present in said fragment ion mass spectral data then said method further comprises:

determining whether or not said candidate parent ion of interest and said one or more fragment ions of interest have substantially similar elution or retention times or ion mobility drift times; and determining a ratio of an intensity of said candidate parent ion of interest to one or more of said fragment ions of interest;

wherein if: (i) said candidate parent ion of interest and said one or more fragment ions of interest are determined to have substantially similar elution or retention times or ion mobility drift times; and (ii) the ratio of said intensity of said candidate parent ion of interest to one or more of said fragment ions of interest falls within a predetermined range; then a determination is made that a known compound of interest is present in said sample and said method further comprises quantifying said known compound of interest.

23. A mass spectrometer comprising:

a fragmentation device;

a mass analyser; and a control system arranged and adapted:

(i) to obtain repeatedly parent ion and fragment ion mass spectral data;

(ii) to determine if a candidate parent ion of interest is present in said parent ion mass spectral data; and (iii) to determine if one or more corresponding fragment ions of interest are present in said fragment ion mass spectral data;

wherein if said candidate parent ion of interest is determined to be present in said parent ion mass spectral data and one or more corresponding fragment ions of interest are also determined to be present in said fragment ion mass spectral data then said control system is further arranged and adapted to:

(iv) to determine whether or not said candidate parent ion of interest and said one or more fragment ions of interest have substantially similar elution or retention times or ion mobility drift times; and (v) to determine a ratio of an intensity of said candidate parent ion of interest (M1) to one or more of said fragment ions of interest;

wherein if (i) said candidate parent ion of interest and said one or more fragment ions of interest are determined to have substantially similar elution or retention times or ion mobility drift times; and (ii) the ratio of said intensity of said candidate parent ion of interest to one or more of said fragment ions of interest falls within a predetermined range; then said control system determines that a known compound of interest is present in said sample and said control system is further arranged and adapted to quantify said known compound of interest.

* * * * *